US012305891B2

(12) United States Patent
Ramirez, III et al.

(10) Patent No.: US 12,305,891 B2
(45) Date of Patent: May 20, 2025

(54) DAYLIGHTING SYSTEMS AND OR SOLAR TRACKING SYSTEMS

(71) Applicant: Texas State University, San Marcos, TX (US)

(72) Inventors: Ricardo Mateo Ramirez, III, San Marcos, TX (US); Bahram Asiabanpour, San Marcos, TX (US)

(73) Assignee: Texas State University, San Marcos, TX (US)

( * ) Notice: Subject to any disclaimer, the term of this patent is extended or adjusted under 35 U.S.C. 154(b) by 291 days.

(21) Appl. No.: 17/986,602

(22) Filed: Nov. 14, 2022

(65) Prior Publication Data

US 2023/0071150 A1    Mar. 9, 2023

Related U.S. Application Data

(63) Continuation-in-part of application No. 16/968,989, filed as application No. PCT/US2019/021304 on Mar. 8, 2019, now Pat. No. 11,904,459.

(60) Provisional application No. 62/640,446, filed on Mar. 8, 2018.

(51) Int. Cl.
*F24S 30/40* (2018.01)
*F24S 23/30* (2018.01)
*F24S 30/00* (2018.01)
*F24S 30/20* (2018.01)

(52) U.S. Cl.
CPC ............... *F24S 30/40* (2018.05); *F24S 23/31* (2018.05); *F24S 30/20* (2018.05); *F24S 2030/12* (2018.05); *F24S 2030/17* (2018.05)

(58) Field of Classification Search
CPC . B25J 17/02; H02S 20/32; F24S 30/40; F16C 11/04
USPC ........ 126/600; 74/502.1; 403/122, 123, 124, 403/142
See application file for complete search history.

(56) References Cited

U.S. PATENT DOCUMENTS

| | | | |
|---|---|---|---|
| 5,670,774 A * | 9/1997 | Hill | G01S 3/784 250/203.4 |
| 2011/0017270 A1* | 1/2011 | Chen et al. | F24S 23/30 136/246 |
| 2018/0164561 A1* | 6/2018 | Kozodoy et al. | G02B 19/0028 |

* cited by examiner

*Primary Examiner* — Vivek K Shirsat
(74) *Attorney, Agent, or Firm* — Shackelford, McKinley & Norton, LLP

(57) ABSTRACT

A method for moving an end effector based on receipt of sunlight, the end effector divided into a first and second upper quadrant located above a Y-axis that corresponds to a solar azimuth and a first and second lower quadrant located below the Y-axis, the first upper and first lower quadrant located on a first side of an X-axis that corresponds to a solar angle and the second upper and second lower quadrant located on a second side of the X-axis, determining a vertical difference between an average of the illuminance received in first and second upper quadrants and an average of the illuminance received in first and second lower quadrants, determining a lateral difference between an average of the illuminance received in the first upper quadrant and the first lower quadrant and an average of the illuminance received in the second upper quadrant and the second lower quadrant, moving end effector along the X-axis in response to the vertical difference being greater than a vertical tolerance; and moving the end effector along the Y-axis in response to the lateral difference being greater than a lateral tolerance.

20 Claims, 24 Drawing Sheets

DAYLIGHTING SYSTEMS AND OR SOLAR TRACKING SYSTEMS

BACKGROUND

This section provides background information to facilitate a better understanding of the various aspects of the disclosure. It should be understood that the statements in this section of this document are to be read in this light, and not as admissions of prior art.

Daylighting systems collect daylight and direct illumination to interior space(s). In some cases, such systems utilize optical fibers, which notably exhibit total internal reflection when radiation is incident below a critical angle; thereby requiring accurate alignment. Solar power systems absorb sunlight to generate electricity and may include a solar tracking system orient solar cells in a desired manner. As with daylighting systems, the effectiveness of solar cells absorbing sunlight are sensitive to the alignment with the sun.

Optic systems, such as discussed above, are often most efficient when perpendicularly (aligned) to the sun. Rotational three degree of freedom (DOF) sun tracking systems allow the payload (e.g., optical fiber(s), solar cell(s), lens(es), mirror(s), etc.) to be in constant alignment with the sun throughout time. This alignment places the system in an optimal position for solar radiation harvesting. These systems not only orient the payload but must also provide structural support. Payloads are exposed to the elements and may be subjected to forces resulting from wind, rain, snow, sleet, etc. Further, systems may be mounted on a roof making weight a concern.

SUMMARY

An exemplary solar tracking system includes an end effector comprising optical elements, a face for orienting toward sunlight, a central axis extending normal to the face, and an X-axis and a Y-axis dividing the face into quadrants, the X-axis corresponding to a solar angle and the Y-axis corresponding to a solar azimuth, a course sensor comprising light dependent resistors (LDRs) mounted on the face to measure illuminance, the LDRs comprising a first LDR located in a first upper quadrant, a second LDR located in a second upper quadrant, a third LDR located in a first lower quadrant, and a fourth LDR located in a second lower quadrant, wherein the first and second upper quadrants are located on an upper side of the Y-axis, the first and second lower quadrants are located on a lower side of the Y-axis, the first upper quadrant and the first lower quadrant are located on a first side of the X-axis, and the second upper quadrant and the second lower quadrant are located on a second side of the X-axis; an actuator coupled to the end effector; a controller in communication with the course sensor and the actuator, the controller configured to determine a vertical difference between an average illuminance received in the first and second upper quadrants and received in the first and second lower quadrants; determine a lateral difference between an average illuminance received in the first upper quadrant and the first lower quadrant and received in the second upper quadrant and the second lower quadrant; cause the end effector to move along the X-axis in response to the vertical difference being greater than a vertical tolerance; and cause the end effector to move along the Y-axis in response to the lateral difference being greater than a lateral tolerance.

An exemplary method for moving an end effector based on receipt of sunlight, wherein the end effector is divided into quadrants by an X-axis and a Y-axis, the X-axis corresponding to a solar angle and the Y-axis corresponding to a solar azimuth, a first and second upper quadrant located above the Y-axis and a first and second lower quadrant located below the Y-axis, the first upper and first lower quadrant located on a first side of the X-axis and the second upper and second lower quadrant located on a second side of the X-axis, the method including determining a vertical difference between an average illuminance received in first and second upper quadrants and received in first and second lower quadrants, determining a lateral difference between an average illuminance received in the first upper quadrant and the first lower quadrant and received in the second upper quadrant and the second lower quadrant, moving end effector along the X-axis in response to the vertical difference being greater than a vertical tolerance; and moving the end effector along the Y-axis in response to the lateral difference being greater than a lateral tolerance.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion. As will be understood by those skilled in the art with the benefit of this disclosure, elements and arrangements of the various figures can be used together and in configurations not specifically illustrated without departing from the scope of this disclosure.

DETAILED DESCRIPTION

Figure 1A:
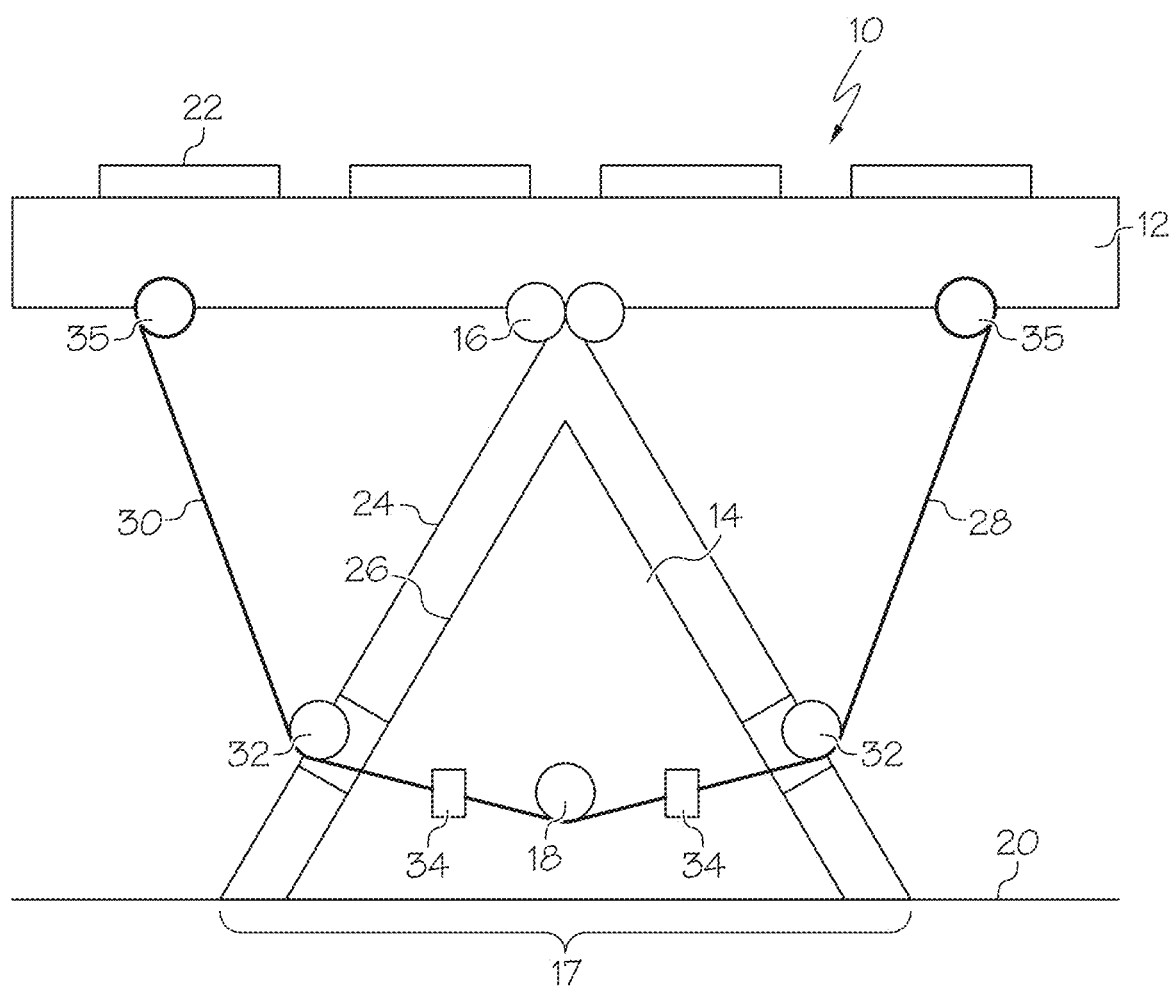
FIG. 1A illustrates an exemplary daylighting and or solar tracking system.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Although relative terms such as "outer," "inner," "upper," "lower," and similar terms have been used herein to describe a spatial relationship of one element to another, it is understood that these terms are intended to encompass different orientations of the various elements and components in addition to the orientation depicted in the figures. Additionally, as used herein, the term "substantially," "about," "generally," and similar terms are used as terms of approximation and not a terms of degrees, and are intended to account for the inherent deviations in measured and calculated values that would be recognized by a person of skill in the art. Furthermore, as used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Optic systems are most efficient when the optics are perpendicular (i.e., aligned) to the sun. Two-axis sun tracking systems allow optics to be in constant alignment with the sun throughout time. This alignment places the optics in an optimal position for solar radiation harvesting.

However, artificial illumination systems consume significant resources to power and maintain. These systems are also responsible for various limitations and hazards due to the nature of the light being different from natural solar illumination. The aforementioned limitations can occur due to flickering, pulsing, and missing light frequencies in the artificial illumination.

As such, natural illumination systems have been utilized to substitute artificial illumination systems. Currently, skylights and sky tubes are used to bring natural illumination to areas where windows are not sufficient. Skylights present an open window to the sky. Sky tubes gather natural light from outside into a tube that conducts the light to one or more interior spaces. The tube may be 10 cm to 50 cm in diameter.

Another alternative natural illumination system is referred to as a daylighting system. In optical fiber systems, exterior solar panels collect and concentrate natural light into optic fiber cables or strands. The optic cable conducts the light into an illumination distributor that is located in an interior space. The optic cable may be narrower and conduct light more efficiently than a tube. It may also be capable of more turns without losing as much light. As such, sunlight can be experienced deep into buildings and far away from windows. Optical fiber daylighting systems are being used to eliminate or reduce the need for artificial light when the natural light is available. In some cases, a small amount of natural light may compensate for the detrimental effects of artificial light. Daylighting systems also reduce the demand and use of artificial illumination, which increases the product life cycle and reduces the operational cost of the artificial illumination.

Current commercialized optical fiber daylighting systems use a gimbal or series architectures which has resulted in systems with low optical area, lower payload capacity, and high manufacturing cost. Series or open looped architectures utilize larger linkages for rigidity requiring larger motors leading to higher aggregate cost and low strength to weight ratios. Parallel or closed looped structures feature large payload to manipulator mass ratios, high stiffness, low inertia and high dynamic performance. The optical area for optical fiber daylighting (OFD) systems is the available area for concentrating light into optical fibers. An increase in optical area generally means more light is harvested and transmitted through the optical fibers for indoor/interior illumination. The architecture presented has enough end effector surface area to support a large optical area or more lens/reflectors. The jointed OFD systems disclosed herein can provide an optical area two times greater than a gimbal structured commercial OFD system having the same size footprint.

In many cases, optical fiber daylighting systems have three main components. A first component is an outdoor sunlight concentrator or collector, which is generally a large flat panel composed of Fresnel lenses to collect and concentrate the solar illumination incident on the panel. The collector may also feature infrared and ultraviolet filters to limit the light to the visible spectrum or another spectrum. In addition, the collector can be attached to a motion table or pivoting stand that follows the sun as the sun moves across the sky from daybreak to sunset. The second component of an optical fiber daylighting system is a sunlight transport to transport the concentrated natural light inside the building using fiber optic cables. The third part is a diffuser inside the building where the light is wanted. The natural light is diffused by an appropriate interior fixture connected to the fiber optic cables. The fixture may also have artificial light sources for use on darker days or at nighttime or to supplement the full complement of sunlight.

However, optical fiber daylighting systems have numerous limitations in terms of design and performance. For instance, due to the requirement for numerous parts, optical fiber daylighting systems are costly to fabricate. In fact, the high cost of fabricating optical fiber daylighting systems has prevented the mass adoption of this type of technology. Furthermore, current optical fiber daylighting systems have limited sunlight tracking capabilities that in turn limit the amount of captured light.

Similarly, cable-driven parallel robot systems have limited design frameworks. Such limited design frameworks affect the commercialization of such systems that use these structures for tracking. For instance, United States Patent Application Pub. No. 2014/0105673A1 describes a roller bearing for a tracking system main joint. However, such systems have limited degrees of freedom for sunlight tracking.

In some embodiments, the present disclosure pertains to a system or method using a robotic coupling joint. The systems or methods of the present disclosure generally include: (1) an end effector or surface with at least two degrees of freedom; (2) a stand or base that stabilizes the end effector at a desired location; and (3) a spherical joint positioned between the end effector and the stand for facilitating the at least two degrees of freedom. In some embodiments, the systems of the present disclosure also include a surface mobility system for tilting or rotating the surface.

Additional embodiments of the present disclosure pertain to methods of moving end effector of the systems of the present disclosure. For instance, in some embodiments, the methods of the present disclosure include: (1) positioning a system of the present disclosure at a desired location; and (2) actuating the surface mobility system such that one or more actuated motors of the surface mobility system move the surface by pulling or releasing one or more linking elements.

Specific and non-limiting embodiments of the systems of the present disclosure can be illustrated in FIGS. 1A-1E and 2-4 as system 10, which contains end effector 12 with at least two degrees of freedom (two-axis tracker), stand 14 for stabilizing system 10 at a desired location 20, a joint 16 positioned between end effector 12 and the stand 14 for facilitating the at least two degrees of freedom, and mobility system 17 for tilting and/or rotating end effector 12. In some embodiments, joint 16 is a spherical joint and may provide a single sphere (FIGS. 3-4) or more than one sphere (FIGS. 1A and 1C), as discussed further below.

End effector 12 is coupled to one or more optical elements 22 (e.g., optical fiber(s), solar cell(s), lens(es), mirror(s), etc.). In addition, stand 14 includes an inner region 26 and an outer region 24. Inner region 26 includes a plurality of outer surfaces that converge at an upper central region to form an internal cavity that may house components sensitive to the elements, such as electronic controls, motor(s), batteries, or the like. The outer surfaces generally surround the internal cavity to prevent or minimize exposure to external elements but may provide openings components of the mobility system 17. Outer region 24 includes a plurality of anchors that converge at an upper central region to form a single attachment point where joint 16 is positioned between the end effector 12 and stand 14. Surfaces of the outer region may be open and do not require a barrier preventing exposure to the elements; however, one may be provided if desired. In addition, mobility system 17 includes motor(s) 18 that is linked to surface 12 by linking element(s) 28 and 30 (e.g. cables, belts, chains, etc.), which allow the motor to control movement of the surface. Linking elements 28 and 30 may also be coupled to one or more motion control objects that aid movement/control of the surface, such as pulleys 32, tensioners/springs 34, swivels 35, or the like.

Figure 1B:
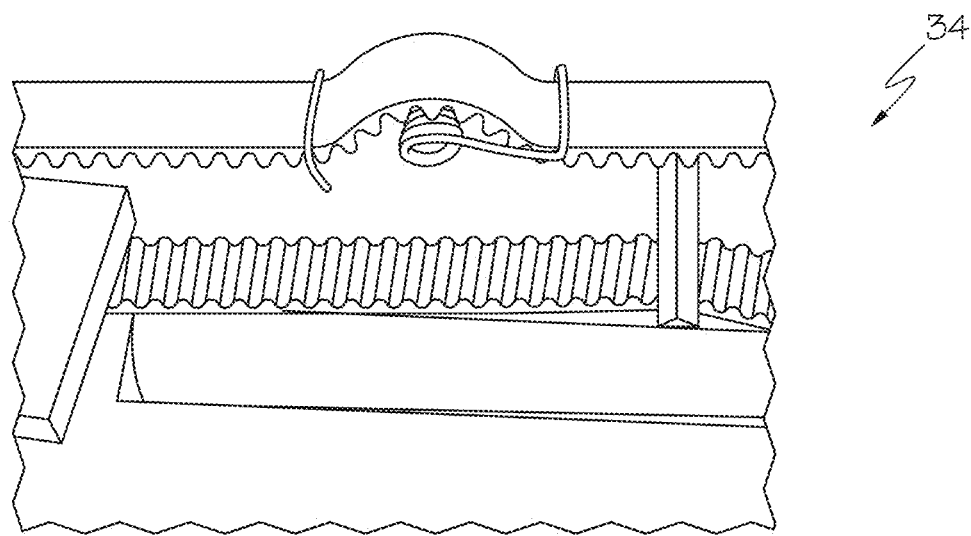
FIG. 1B illustrates an exemplary belt type linking element and a spring tensioner.
Figure 1C:
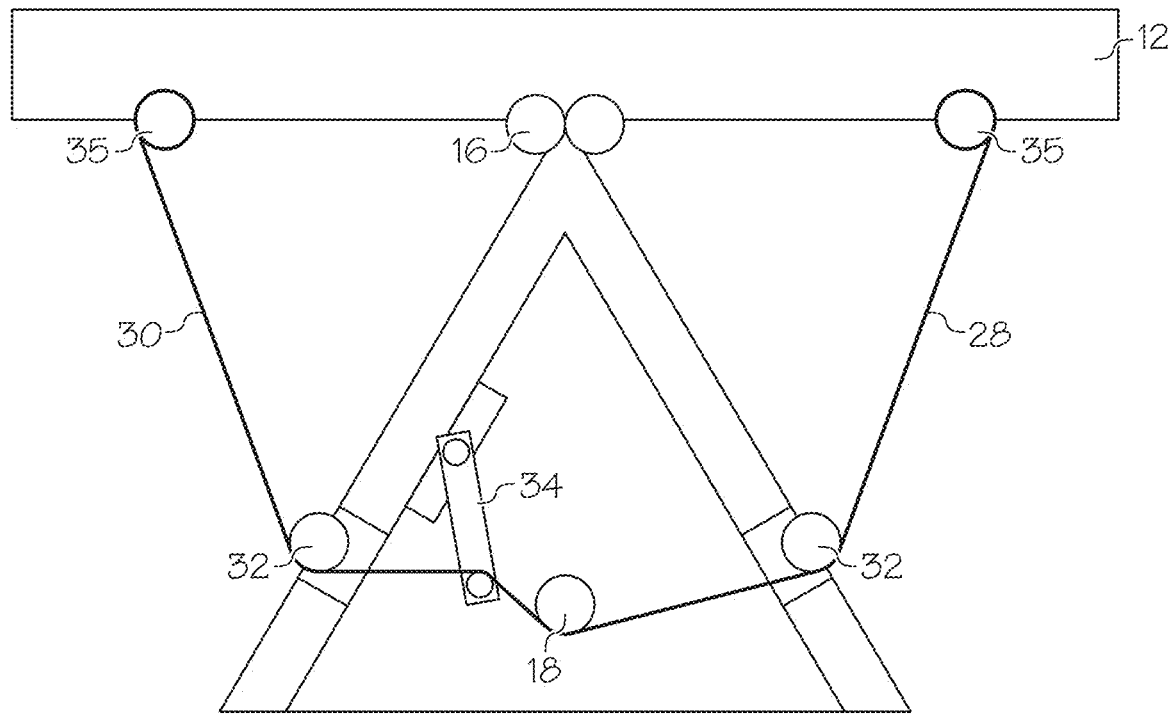
FIG. 1C illustrates another exemplary daylighting and or solar tracking system.

From the view shown in FIGS. 1A and 1C, the components of the mobility system 17 allows tilting relative to at least one axis or a first axis (or about the stand). However, further linking element(s), motor(s), pulleys/swivels, tensioners/springs, or combinations thereof (not shown) may be present to allow tilting relative to second axis normal to the first. For example, an arrangement identical or nearly identical what is shown in FIGS. 1A and 1C may be positioned about 90° apart to allow tiling relative to the second axis (e.g., FIG. 3).

In operation, the actuation of motor 18 moves end effector 12 by pulling or releasing linking elements 28 and 30. The motion of linking elements 28 and 30 created by the motor 18 is transferred to end effector 12 by pulleys 32 and/or swivels 35 (or motion control objects), and joint 16 allows the end effector to pivot about stand 14. Optional tensioners 34 may be utilized to ensure linking elements 28 and 30 do not have slack that allows unwanted play or motion and remain engaged to motor 18. The embodiment shown and discussed may also involve a second set of paired linking elements, motion control objects, or the like. These corresponding components of the mobility system 17 positions 90° apart from the first pair may operate in the same manner (e.g., FIG. 3). Thus, it shall be recognized system 17 allows two-axis movement of end effector 12. However, it shall be recognized that other embodiments may utilized using fewer or more linking elements.

As set forth in more detail herein, the methods and systems of the present disclosure can have numerous additional embodiments. For instance, the systems of the present disclosure can have various shapes and components. Moreover, various methods may be utilized to move end effector of the systems of the present disclosure for various purposes.

The robotic coupling joint systems of the present disclosure may be in various forms. For instance, in some embodiments, the systems of the present disclosure are part of optical fiber daylighting systems. In some embodiments, the systems of the present disclosure are part of photovoltaic systems. In some embodiments, the systems of the present disclosure are robotic systems. In some embodiments, the systems of the present disclosure are generally designed to move an end effector relative to stand or base. Moreover, the systems of the present disclosure may have various end effectors, mobility systems, stands/bases, and spherical joints in various arrangements.

The systems of the present disclosure may utilize various end effector assemblies. The end effector or surface of the present disclosure may also have various components, shapes, and sizes suitable for supporting or protecting optical elements of the system. Further, the end effector generally tracks sunlight to allow the optical elements to operate efficiently as discussed in further detail herein. In some alternative embodiments, the end effector may support any components that are desirable to move relative to a stand or base. As non-limiting examples, in some embodiments, the end effector is in the form of a surface or any suitable structure. For instance, in some embodiments, the end effector of the present disclosure is in the form of a disk. In some embodiments, the end effector of the present disclosure may be circular, square-like, or rectangular. Additional surface shapes and sizes can also be envisioned.

The end effector of the present disclosure may also have additional components. For instance, in some embodiments, the end effector of the present disclosure may be coated with a protective layer or provide a protective shield. In some embodiments, the protective layer protects the surface from various natural elements, such as heat, solar radiation, and moisture. In some embodiments, the protective layer is a polymer coating, such as polyvinyl chloride.

In some embodiments, the end effector may also be associated with one or more optical elements, such as components of a daylighting or solar system. Optical elements 22 generally refer to materials/components that can utilize sunlight in a useful manner. For instance, in some embodiments, the one or more optical elements include, without limitation, optical fibers, solar panels, lenses, mirrors, parabolic dishes, and combinations thereof. Optical elements may be associated with end effector in various manners. For instance, in some embodiments, optical elements are coupled to a surface, such as through direct attachment. In some embodiments, the optical elements face outwards from the surface.

In some embodiments, the end effector is coupled to a single optical element. In some embodiments, the end effector of the present disclosure is coupled to a plurality of optical elements 22. In some embodiments, the plurality of optical elements are arranged on a surface in the form of a parallel framework. In some embodiments, the plurality of optical elements lack an open loop system on the surface. The optical elements of the present disclosure can also have various shapes and sizes. For instance, in some embodiments, the optical elements are rectangular, circular, or square-like. In an exemplary embodiment, optical elements 22 are Fresnel lenses, for example, 12-sided (dodecagon) Fresnel lenses.

In more specific embodiments, the optical elements of the present disclosure include solar panels. In some embodiments, the solar panels are arranged on a surface in a parallel framework. In some embodiments, the solar panels are utilized to convert light into electricity. In some embodiments, the solar panels are utilized to concentrate incident light.

In some embodiments, the optical elements may include optical tracking sensor(s) or the like. These sensor(s) may guide movement of the joint system to track sunlight. In some embodiments, the joint system may also include processor(s), controller(s), firmware, software, memory storage, power source providing power to various components of the system, or the like to control operation of the system as desired. For example, the sensor(s), motor(s), optical element(s) may be coupled to the processor(s)/controller(s) that operates the system in manner desired in accordance with software/firmware stored in memory storage. The optical elements of the present disclosure may also include cabling or wiring. For instance, in some embodiments, the cabling/wirings may be attached to the optical elements and connected to an external source, such as a light source, power storage, or the like. In other embodiments, the optical elements include optical fibers, lenses, mirrors, or a combination thereof. In some embodiments, the optical fibers concentrate incident light obtained from the optical elements.

A stand or bases generally refers to structures that are able to stabilize the system at a desired location. The stand of the present disclosure can have numerous shapes. For instance, in some embodiments, the stand of the present disclosure includes a covered internal cavity. In some embodiments, the covered internal cavity includes one or more apertures.

In some embodiments, the internal cavity of the stand houses or protects a mobility system or environmentally sensitive components of the system. In some embodiments, linking elements from the mobility system exit the internal cavity through one or more of the apertures in the covers. In some embodiments, the internal cavity is in the form of a pyramid or any other suitable shape. As a non-limiting example, the stand includes a plurality of outer covers. In some embodiments, the plurality of outer covers converge at an upper central region to form an internal cavity. In some embodiments, the outer covers have four adjacent faces at dihedral angles to each other with a slot and a hole for linking elements to pass through.

In some embodiments, the stand includes a plurality of anchors. In some embodiments, the plurality of anchors converge at an upper central region to near a pivot point. In some embodiments, the pivot point is a point of attachment of a joint, which couples the stand to the end effector. In some embodiments, the joint is positioned between the end effector and the stand at the pivot point.

In some embodiments, the plurality of anchors form edges of a pyramid. In some embodiments, the plurality of anchors include four anchors in a pyramid shape. In more specific embodiments, the stands of the present disclosure include an inner region and an outer region. The inner region includes a plurality of outer surfaces that converge at an upper central region to form an internal cavity, and the outer region includes a plurality of anchors that converge at an upper central region to form a single attachment point. In some embodiments, the spherical joint is positioned between the surface and the stand at the single attachment point.

The stands of the present disclosure may be utilized to stabilize the systems of the present disclosure at various desired locations. For instance, in some embodiments, the desired locations may be a roof of a building, such as a house. In some embodiments, desired location may be a field, such as a field associated with a solar power plant.

The systems can include various types of joints providing at least two degrees of freedom. In some embodiments, joint 16 may limit movement along only two axes. In some embodiments, the joint is a spherical joint and includes at least one sphere positioned within at least one socket such that it is able to provide three degrees of freedom when it is positioned within the socket (e.g., spherical joint 16 shown in FIG. 4). In some embodiments, the at least one socket is coupled to the stand, and the at least one sphere is coupled to the end effector. In other embodiments, the at least one socket is coupled to the end effector, and the at least one sphere is coupled to the stand. In some embodiments, the spherical joint also includes a cover for to prevent or minimize exposure to external elements. In some embodiments the cover is fixed to the end effector.

In some embodiments, the spherical joints of the present disclosure include the following components: (1) a first plate corresponding to the at least one socket; (2) a second plate corresponding the at least one sphere; (3) at least one sphere that is positioned between the first plate and the second plate; and (4) an optional connector securing the sphere(s) between the first and second plates. Non-limiting embodiments of the aforementioned spherical joints are illustrated in FIGS. 5-9 as spherical joint 16. In such embodiments, spherical joint 16 includes first plate 38, a second plate 40, a plurality of spheres 36 that are positioned between first plate 38 and second plate 40, and connector 46 that connects the first and second plates secures the spherical joint together.

In some embodiments, the first plate includes at least one socket for housing at least some of the spheres. In some embodiments, the number of sockets matches the number of spheres provided, such as two or more sockets, three or sockets, or four or more sockets. In some embodiments, each socket may house at least a portion one of the spheres. In some embodiments, the sockets are in the form of recessions or bosses for receiving the spheres. In some embodiments, it is desirable for the first plate to be capable of moving relative to the spheres. In some embodiments, the sockets are capable of sliding along one or more of the spheres. In some embodiments, the first plate includes four sockets for housing four spheres. In some embodiments, the first plate of the present disclosure is coupled to the end effector or stand by any suitable means. In some embodiments, the first plate of the present disclosure is coupled to the end effector or stand through one or more apertures on the first plate. In some embodiments, internal threads on a first plate are utilized for connecting the first plate to the end effector or stand.

The spherical joints of the present disclosure can also include at least one sphere. In some embodiments, the spherical joint may be a circumscribed spherical joint that include two or more spheres, three or more spheres, or four or more spheres. In the non-limiting example shown, the spherical joints of the present disclosure include four spheres. In some embodiments, the spheres are identically shaped. In some embodiments, the spherical joint may further comprise a locking mechanism to prevent rotation of the end effector about the stand or rotation about a z-axis. As a nonlimiting example, the locking mechanism may comprise a solenoid that may be actuated to prevent rotation about a z-axis. In some embodiments, a plane parallel to the base of the stand passes through the center of all of the spheres. The spheres of the spherical joints of the present disclosure can also include various arrangements. For instance, in some embodiments, the spheres include attachment points that allow the sphere to be fixed in place.

The spherical joints of the present disclosure can also include various types of second plates. For instance, in some embodiments, the second plate of the present disclosure is coupled to the plurality of spheres. In some embodiments, the second plate fixes the spheres in place via the attachment points and prevents the spheres from moving relative to the second plate. In some embodiments, the second plate of the present disclosure is attached to the stand or end effector. In some embodiments, the second plate shares similar features as the first plate, such as providing sockets, recession, or bosses for receiving the spheres.

The spherical joints of the present disclosure can also optionally include various types of connectors securing the sphere(s) between the first and second plates, but still allowing the first plate to move relative to the second plate. For instance, in some embodiments, the connector(s) is a cable, such as a steel cable or elastic cable. The connectors of the present disclosure can have various arrangements within a spherical joint. In some embodiments, at least one connector is tensioned aid retention of the spheres between the first plate and/or second plate. In some embodiments, the connector(s) of the present disclosure couples the first plate to the second plate. In some embodiments, the connector(s) of the present disclosure hold the first plate and/or second plate against the spheres. In some embodiments where the connector(s) have limited elasticity (e.g., steel cable), the connector may be attached to the top plate, pass through an aperture in the bottom plate, and then coupled to a weight. In some embodiments, a connector may not be necessary and may be omitted from the spherical joint. As a nonlimiting example, the linking elements may provide sufficient compressive force in some situations, thereby making the connector unnecessary.

The spherical joints of the present disclosure can provide the end effector of the present disclosure with various degrees of freedom relative to the stand, such as two or more degrees of freedom. When considering axes at the spherical joint, the joint may provide movement about at least one axis. In some embodiments, two-axis movement is provided by the joint. For example, it is apparent from FIGS. 5-9 that the first plate may move relative to a first axis (i.e., left or right), and/or relative to a second axis (i.e. forward or backwards). Notably, the circumscribed arrangement naturally resists rotation about a vertical (or z-axis).

In some embodiments, the range of motion of the end effector may be at least 30 degrees from the zenith in any direction. In some embodiments, the range of motion of the end effector may be at least 90 degrees from the zenith in any direction. In some embodiments, the range of motion of the end effector may be at least 180 degrees from the zenith in any direction.

In some embodiments, the spherical joints of the present disclosure can limit angular motion or rotation of the end effector about the stand or a vertical axis. In some embodiments, rotation of the end effector requires manipulation of the mobility system, such as cable manipulation.

In some embodiments, the systems of the present disclosure also include a mobility system utilized for tilting or rotating the end effector assembly. In some embodiments, the mobility system includes one or more motors (e.g., motor 18 in FIG. 1), which may be arranged in the stand, that are coupled to end effector by drive pulley and/or linking elements (e.g., linking elements 28 and 30 in FIG. 1). In some embodiments, first ends of two or more linking elements 28 and 30 are coupled to end effector and the other end is coupled to the motor(s) to allow movement or actuation of the end effector relative to the stand. In some embodiments, the linking elements may be distributed approximately equidistantly about the end effector. Rotation may cause shorting of one linking element and lengthening of the other, thereby tilting the end effector clockwise or counterclockwise depending on the direction the motor rotates. For example, it can be seen in FIG. 1 that end effector 12 tilts clockwise or counterclockwise about a first axis as motor 18 actuates linking elements 28 and 30.

Figure 3:
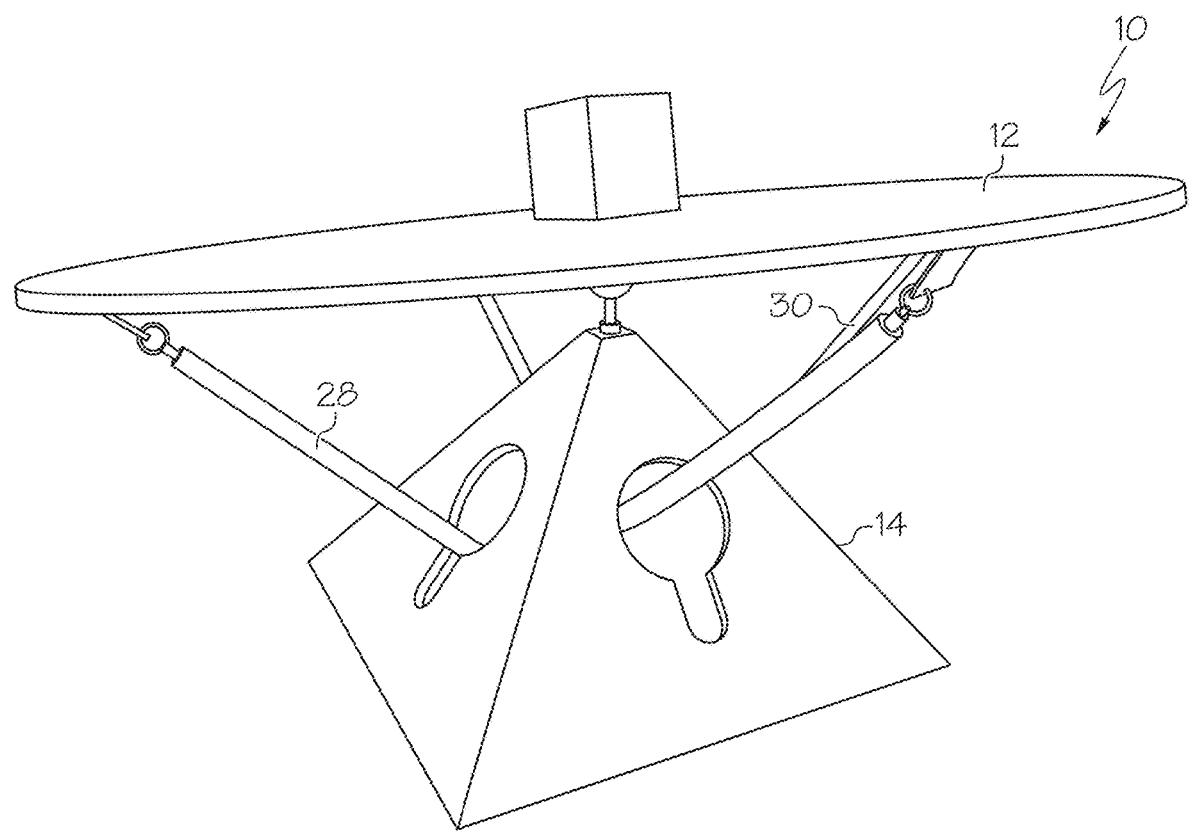
FIG. 3 is another perspective view of an exemplary daylighting and or solar tracking system.

Generally, to provide two-axis motion of the end effector, embodiments of the mobility system may provide three or more linking elements. In some embodiments the three or more linking elements are positioned approximately equidistant from each other. In some embodiments, four linking elements may be provided and positioned approximately equidistant from each other about the end effector. It should be recognized that paired linking elements positioned ~180° apart allow for simple control of tilting about an axis. A non-limiting example in FIG. 3 shows two pairs of linking elements, where each linking element is spaced ~90° from the next and the pairs are spaced ~180° apart. A first pair of linking elements 28 and 30 allows movement of end effector 12 about a first axis, whereas the second pair is positioned approximately perpendicular to the first axis/first pair and allows tilting about a second axis approximately perpendicular to the first.

Figure 17:
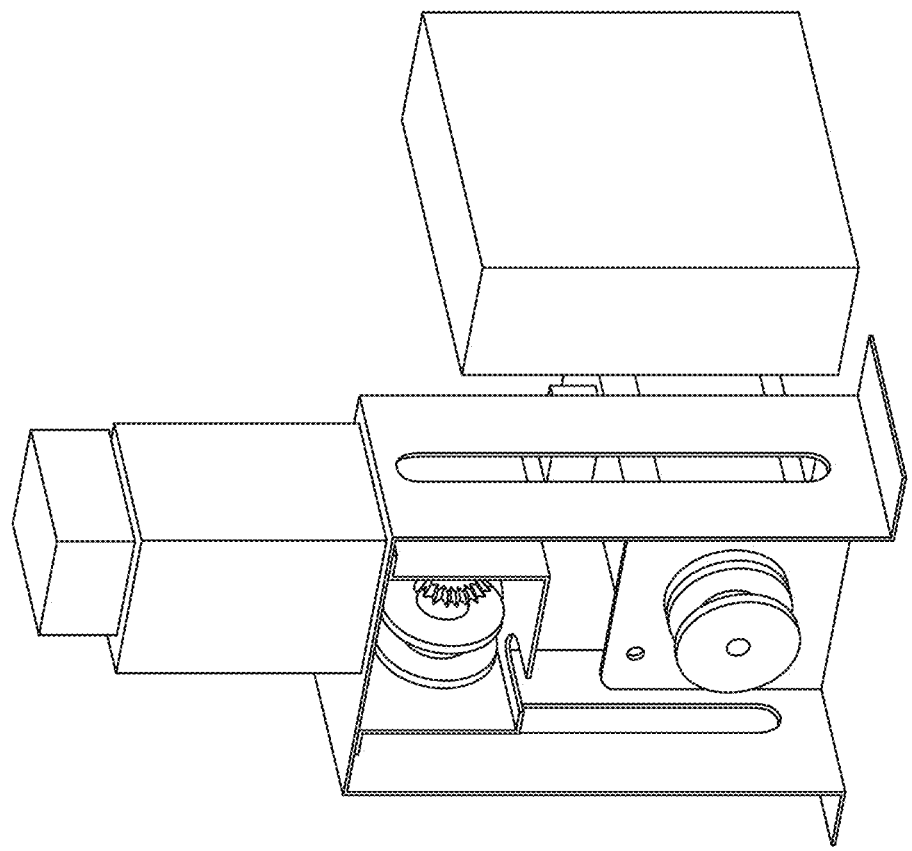
FIG. 17 is a second view of an exemplary dual axis motor assembly for a cable linking element.
Figure 16:
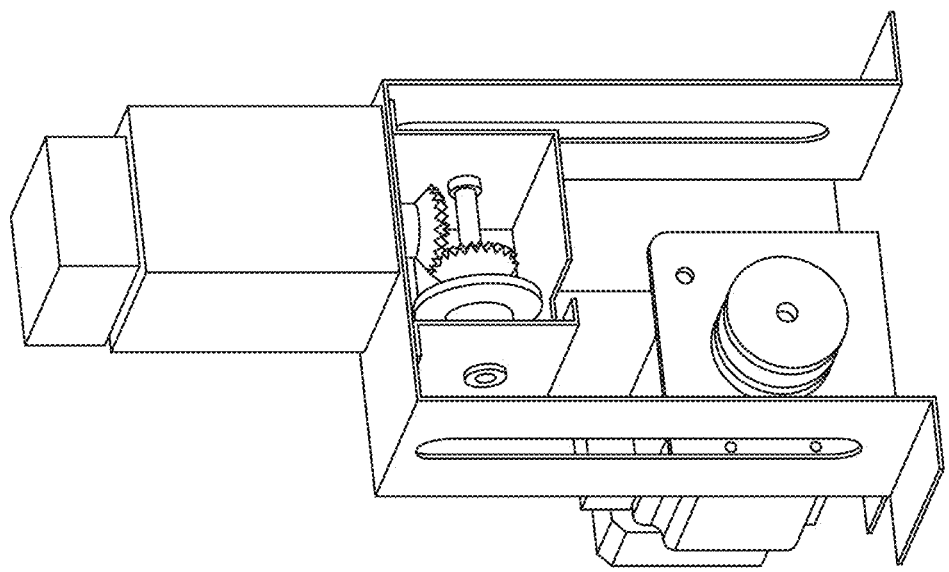
FIG. 16 is a first view of an exemplary dual axis motor assembly for a cable linking element.
Figure 18:
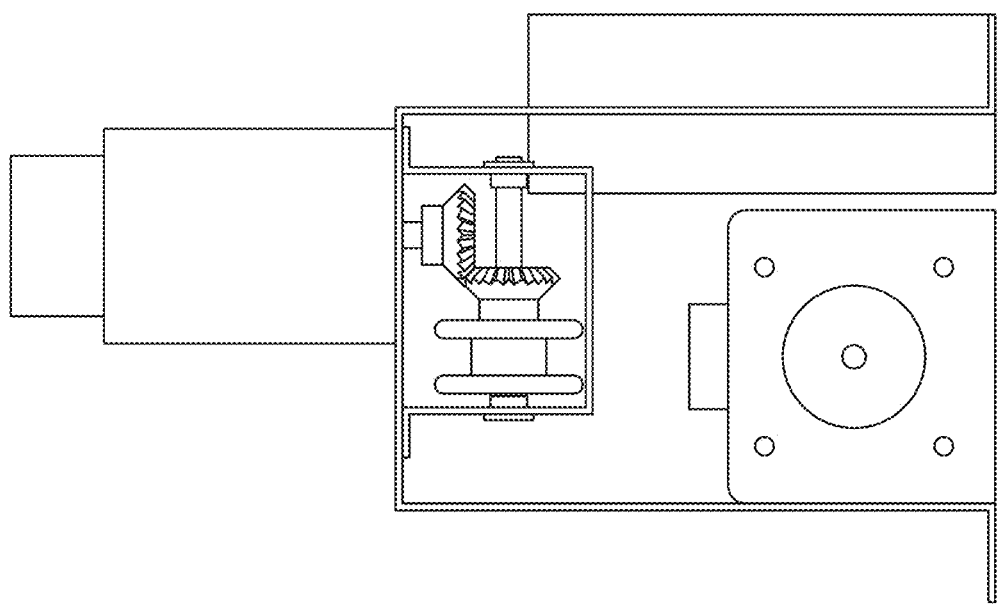
FIG. 18 is a third view of an exemplary dual axis motor assembly for a cable linking element.

In some embodiments, the mobility system provides a dual axis motor assembly, which may provide a motor for each pair of linking elements that allow tilting relative to the first axis and second axis (e.g. FIGS. 16-18). Further, the assembly may also include any drive pulleys, gearing, or combinations thereof desired. As a nonlimiting example, a first pair of linking elements that controls tilting about a first axis may be coupled to the bottom motor and drive pulley, and a second pair of linking elements may be coupled to the top motor and drive pulley controlling tilting about a second axis.

The systems of the present disclosure can utilize any suitable variety of linking elements. For instance, in some embodiments, the linking elements include, without limitation, cables, belts, elastic bands, chains, or the like. In some embodiments, the linking elements include steel cables. In some embodiments, the linking elements include belts. In some embodiments, the linking elements of the present disclosure move in different directions. In some embodiments, the linking elements of the present disclosure move laterally and vertically as the surface moves to different positions. In some embodiments, the movement of at least a portion of the linking elements(s) includes in plane motion corresponding to a center plane of the motor. In some embodiments, the movement of another portion of the linking element(s) includes out of plane motion relative to the center plane.

The linking elements of the present disclosure may be linked to an end effector in various manners. For instance, in some embodiments, the linking elements of the present disclosure are connected to an end effector through direct attachment. In some embodiments, the linking elements of the present disclosure are attached to an end effector near a periphery of the end effector. In some embodiments, the linking elements of the present disclosure are connected to an end effector through one or more motion control objects, such as a swivel.

Motion control objects generally refer to objects that modify or aid motion and movement of the linking elements or mobility system of the present disclosure. For instance, in some embodiments, the motion control objects modify movement of the linking elements, constrain the motion or change direction of motion, or even aid movement or operation of the linking elements. In some embodiments, the motion control objects may also restrict the movement of the linking elements in synchronization with the one or more motors. The surface mobility systems of the present disclosure can utilize various types of motion control objects. For instance, in some embodiments, the one or more motion control objects include, without limitation, guides, pulleys, swivels, constrictors, tensioners, tensioning mechanisms, springs, levers, and combinations thereof.

In some embodiments, the one or more motion control objects include one or more guides, pulleys, swivels, or the like. These objects may modify direction of the linking element(s) or direction of movement of the linking element(s). In some embodiments, the motion control objects may be position at apertures in the stand for the linking elements, such as guides, pulleys, or the like. In more specific embodiments, motion control objects may be guides positioned on the outer cover of the internal cavity of the stand. In some embodiments, at least one of the motion control objects directs, constrains, and/or limits a first portion of at least one of the linking elements to motion along a center plane of a motor (e.g., FIG. 13 internal cavity). In some embodiments, a second portion of the one linking elements may operate out of plane with the center plane. For instance, in some embodiments, the portion of the linking elements positioned between the stand and end effector can move out of plane (e.g., FIG. 1, between 32 and 35), whereas the internal portion stays in plane (e.g. between 32 and 18). As a nonlimiting example, in embodiments utilizing a belt with teeth and a motor pulley with teeth, it may be particularly important to maintain in plane motion or movement of at least a portion of the linking element(s) (portion in internal cavity of the stand or between a motor and motion control objects on outer cover) along a center plane of a motor to avoid potential engagement issues between the belt teeth and pulley teeth. However, the other portion of the linking element(s) (outside the internal cavity or between motion control objects and end effector) may operate out of the center plane without issue. In some embodiments, the motion control object may also constrict motion. In some embodiments, the one or more motion control objects include locking mechanism(s) to prevent or restrict the movement of the linking element. In some embodiments, the locking mechanism may be one or more constrictors.

As a nonlimiting example, the motion control object may be a guide (FIGS. 19-22). The guide may provide a central opening for the linking element to pass through. Top and bottom components of the may be held together with a fastener, such as a set screw. The guide may be designed to fit the aperture in the covers of the stand, such as by providing a slot or slot with a bearing. Further, the guide may provide internal constrictor/bladder, which expands when filled with water to constrict movement of the linking element. The bladder may serve a locking mechanism when the motor assembly is not in motion to lock the end effector in a desired position. One or more surfaces of these guides, such as surfaces sliding on the panel/skin slot and/or linking element, can be Teflon coated, or the parts themselves can be made of Teflon. The apertures in the covers of the stand that come in contact with the guides can be Teflon coated as well. This will reduce the coefficient of friction. Other embodiments may utilize pulleys, roller bearings, or the like as the motion control object.

Figure 1D:
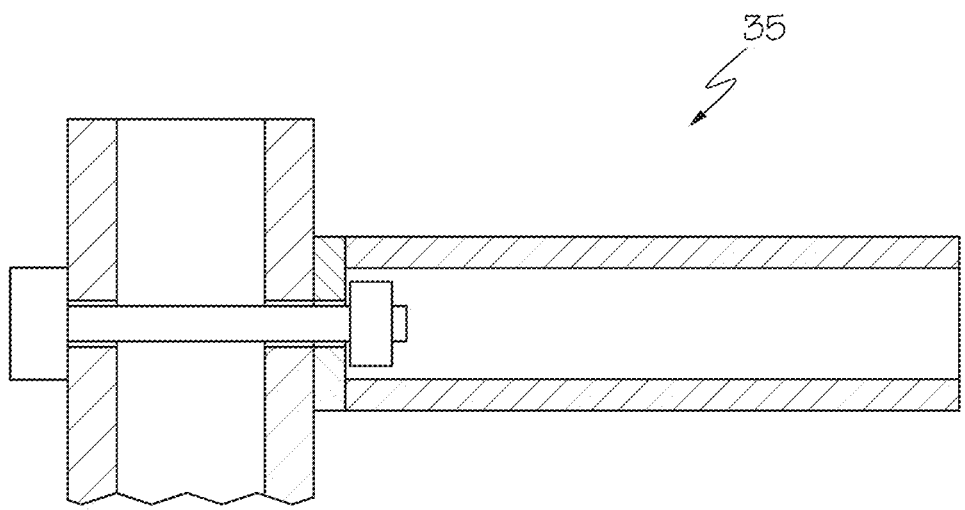
FIG. 1D illustrates an exemplary swivel.
Figure 1E:
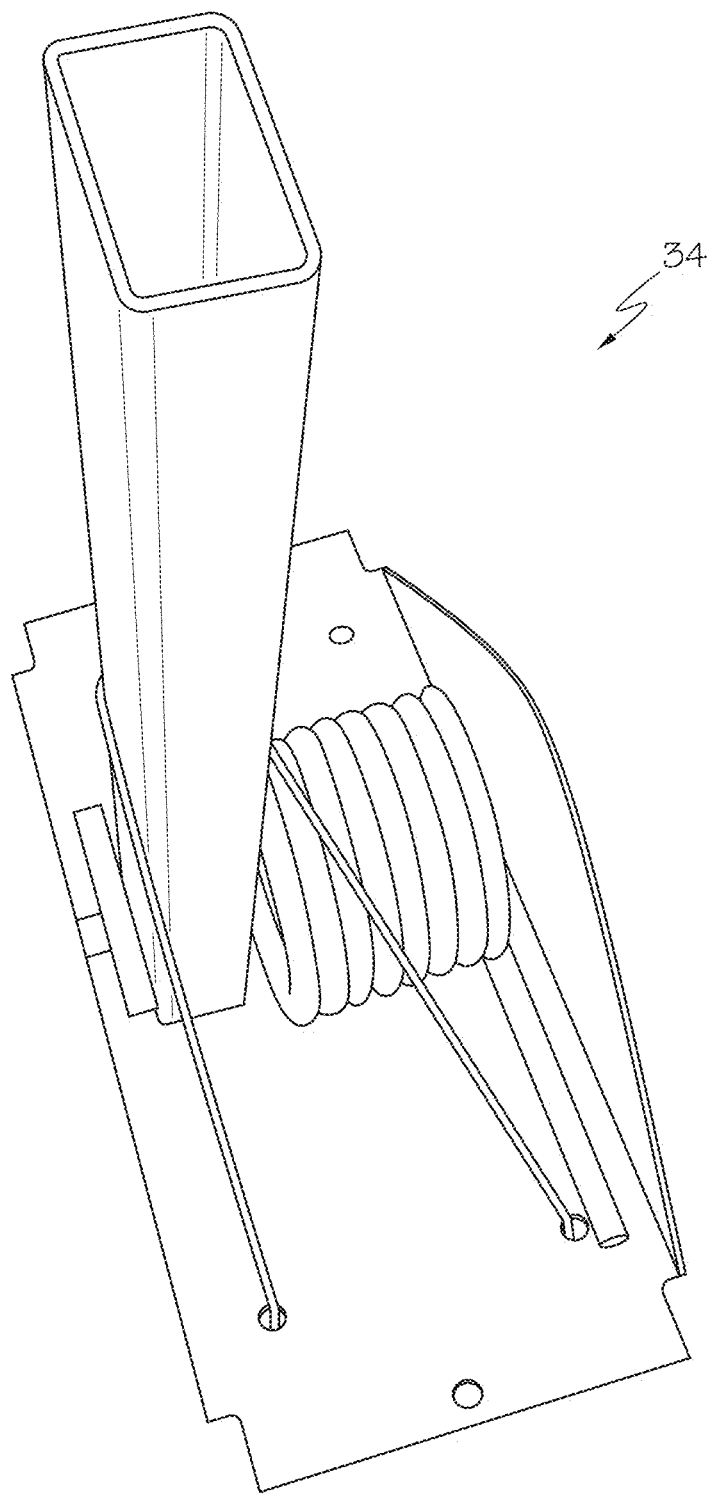
FIG. 1E illustrates an exemplary linking element tensioning mechanism illustrated for example in FIG. 1C.

In some embodiments, the one or more motion control objects modify the direction of the linking element. As nonlimiting examples, the objects may be swivels, springs, or pulleys secured to end effector, which allow the direction of the linking element relative to the end effector to change. In some embodiments, the one or more motion control objects may aid operation of the linking element(s) or mobility system. As nonlimiting examples, the objects may be a tensioning mechanism, spring, or the like (FIGS. 1A-1E). A spring (e.g., FIG. 1B) may be positioned on the linking element to tension the linking element, thereby limiting slack to prevent unwanted motion and to keep the linking element in proper engagement with the motor pulley. In another example, the object may be a tensioning mechanism (FIGS. 1C-1E). The tensioning mechanisms 34 may provide a base that may be secured to the covers of the stand. A pivotal member or lever coupled to the base may be tensioned or sprung (FIG. 1E), and the end of the pivotal member may provide rotating mechanism suitable for engaging the linking element (FIG. 1D). As a nonlimiting example, a nut, bolt, and nylon washer may secure a rotating rod to the lever and tension the linking element. The tension prevents the linking element from disengaging or slipping from the motor, such as by tensioning a belt to keep it engaged with the corresponding teeth of a motor pulley.

The motion control objects of the present disclosure can be positioned around different regions within a system. In particular, in some embodiments, the motion control objects of the present disclosure are positioned at different regions between a motor and a surface.

The surface mobility systems of the present disclosure can also include one or more motors. For instance, in some embodiments, the motors of the present disclosure include a dual axis motor assembly linking element drive. In some embodiments, the motors include motor drive pulleys.

The surface mobility systems of the present disclosure can be associated with various regions of the systems of the present disclosure. For instance, in some embodiments, the surface mobility systems of the present disclosure are associated with a stand. In some embodiments, the surface mobility systems of the present disclosure are associated with an internal cavity of a stand.

In some embodiments, a method of operating a robotic coupling joint system moves an end effector relative to a stand. This system may comprise any of the components or embodiments discussed previously above or further below, such as a spherical joint between the end effector and stand, mobility system, or the like. In some embodiments, the method operates the joint system to track sunlight in a daylighting system or photovoltaic system.

In some embodiments, a robotic coupling joint system may be positioned at or on a base region, such as a roof, field, or any other suitable base surface. The end effector may be actuated by the mobility system to move or position the end effector as desired, such as to move the end effector to a position approximately parallel to sunlight when optical elements are provided by the end effector. For example, motor(s) 18 may rotate and cause linking element(s) 18 to lengthen and/or shorten, thereby causing the end effector to move to a desirable position. In some embodiments, two or more linking elements may be lengthened and may cause the end effector to tilt about a first axis and/or a second axis or actuate relative to the stand.

In some embodiments, a power source may be provided that provides power to the various components of the system. Further, processor(s)/controller(s) may be coupled to the electronic components of the system, such as the motor, power source, actuator filling a bladder, or the like. Memory may store firmware or software controlling operation of the system. As a nonlimiting example, the system may be programmed to allow for the movement of the end effector, such that exposure off the surface to sunlight is maximized throughout a day.

For instance, the sun can be tracked through a day by pivoting the end effector, providing optical elements collecting sunlight, about one or more axis. In a flat landscape, the morning sun will be on the horizon in the east and the evening sun will be on the horizon in the west, meaning the sun may be track ~180° or half a circle. In some instances, less tracking may be necessary, e.g., positioning on hills or mountains. In some cases where systems mobility system is perfectly aligned with the rise/fall of the sun from east to west, only one degree of freedom may be needed, i.e., tilting about a first axis (or tilting east or west when perfectly aligned). However, other case may also require tilting north or south when the system is not perfectly aligned, thereby allowing tilting of the end effector both east or west and north or south.

In some embodiments, the optical fibers of the present disclosure reduce material cost per illumination area. In particular, the optical fiber daylighting systems of the present disclosure can be fabricated in a cost-effective manner. Moreover, due to enhanced sunlight tracking through at least three degrees of freedom, the optical fiber daylighting systems of the present disclosure can increase optical areas and maximize the gathered sunlight.

For instance, the spherical joints of the present disclosure are designed for ease of manufacture and high reliability. Moreover, the optical fiber daylighting systems of the present disclosure have an architecture that provides more surface area for concentration optics, such as Fresnel lens and parabolic dishes.

As a result, the higher surface areas of the optical fiber daylighting systems of the present disclosure can enable more light to be harvested and transmitted downstream for illumination. In addition, the higher strength to weight ratio of the optical fiber daylighting systems of the present disclosure make them suitable candidates for numerous applications, such as rooftop applications. For instance, in some embodiments, large arrays of the optical fiber daylighting systems of the present disclosure can be added to a roof to support the required light in a building.

Moreover, in some embodiments where the optical fiber daylighting systems of the present disclosure have parallel frameworks, the parallel frameworks can harvest more light for a comparable footprint than other optical fiber daylighting systems that utilize serial or open looped structures. Furthermore, in some embodiments, the spherical joints utilized in the optical fiber daylighting systems of the present disclosure can limit angular rotation of the end effector about the stand, and/04 rotation of the end effector requires cable manipulation. This means twisting/spinning/motion around the z-axis (perpendicular to the stand) of the end effector is held to a minimum.

Natural illumination may be used as a force in this world to spread autonomous daylighting solutions aligning the well-being of humanity for its enduring nurture. In addition natural illumination unites the world in energy independence to its greatest extent for advancement in health and ecology.

Reference is now be made to more specific embodiments and experimental results that provide support for such embodiments. However, it is noted that the disclosure herein is for illustrative purposes only and is not intended to limit the scope of the claimed subject matter in any way.

FIG. 1A provides an isometric view of an optical fiber daylighting system with a robotic coupling joint system. In this illustration, the top disk is a robot arm end effector that carries the solar illumination collectors. The top disk may be any suitable shape and size to carry the desired number and size of collectors. The collectors are shown as rectangular, but may be circular or square. Collection optics face outward to concentrate incident light into optical fibers. The top disk is supported by a stand with four legs in a pyramid shape. The stand has a central upper attachment point where the four legs meet. The attachment point attaches the end effector to the stand or base via one or more spherical joints. The mobility system controls movement of the end effector relative to the stand, as described previously above. FIG. 1B shows a tensioner (e.g., spring) positioned on the linking element (e.g. belt). FIG. 1C shows another embodiment of a system similar to the above noted system but utilizing a tensioning mechanism (FIGS. 1D-1E).

Figure 2A:
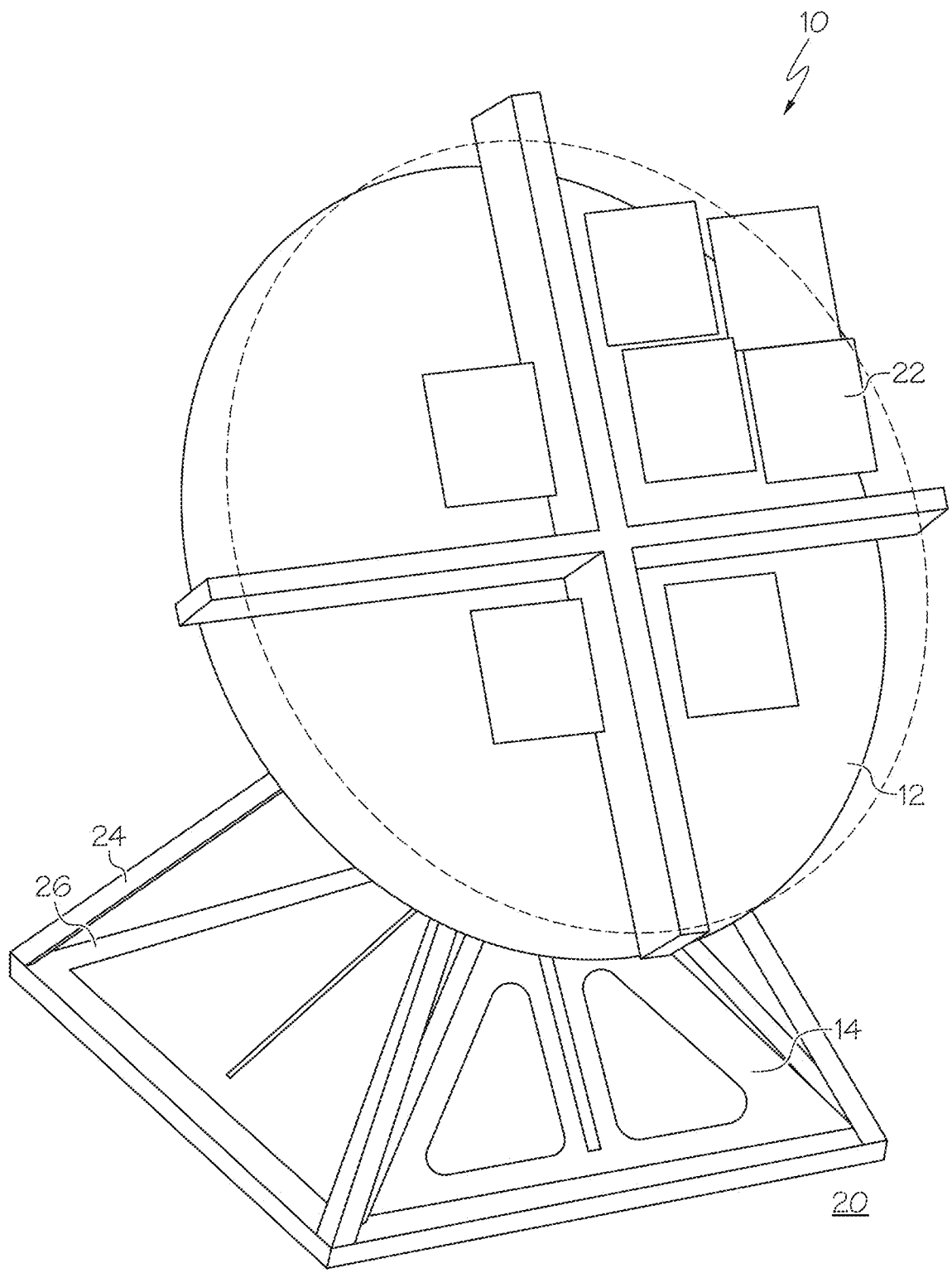
FIG. 2A is a perspective view of an exemplary daylighting and or solar tracking system.
Figure 2B:
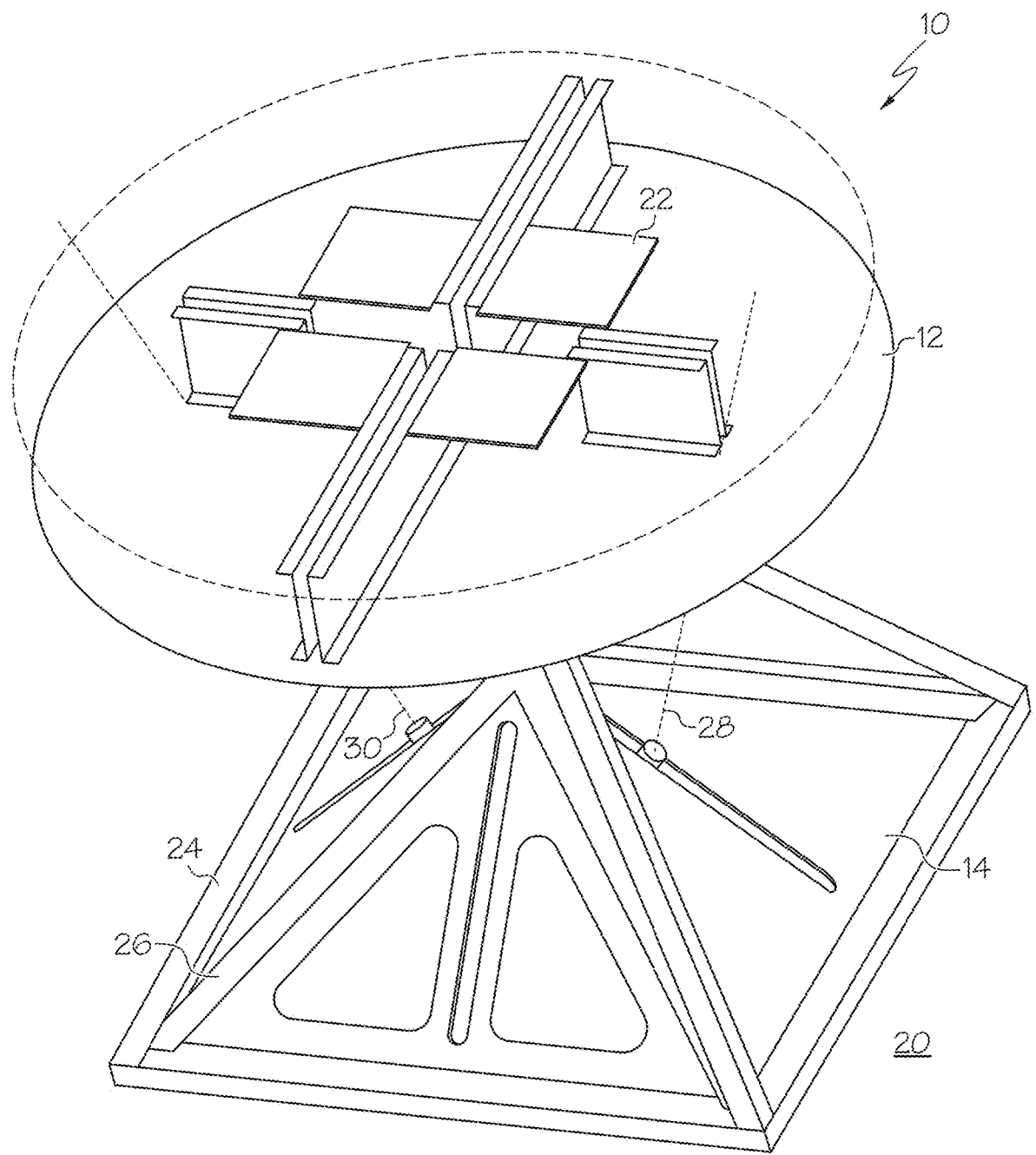
FIG. 2B is another perspective view of an exemplary daylighting and or solar tracking system.

FIGS. 2A-2B illustrates an isometric view of an embodiment of an optical fiber daylighting system including a robotic coupling joint system. The light collectors can take different shapes and configurations. The daylighting system illustrated in FIGS. 2A-2B has three additional collectors. The end effector is a circular structure. However, in additional embodiments, the end effector may be rectangular to allow for more collectors.

FIG. 3 shows a side view of another embodiment of an optical fiber daylighting system with a robotic coupling joint system. The collectors and optical fibers are not shown for simplicity but would be attached to the upper end effector and then routed through or around the pyramidal stand. FIG. 3 also shows the architecture for a spherical joint with a single sphere suitable for solar tracking. A pyramid structure supports the spherical joint. It has four adjacent faces at some dihedral angle to each other with a slot and a hole for cables to pass through. Inside of the pyramid, there are two motors for articulating the end effector by pulling or releasing the cables. The cables may be of elastic bands to reduce unwanted motion and are attached to the end effector near the periphery of the disk, collector platform, or end effector. The cables are in general 90 degrees from each other and extend in different directions at the attachment to the motors. The cables move laterally and vertically as the end effector moves to different positions. The faces each have a large circular cutout to accommodate this movement. Alternatively a guide may be used to slide along the slot. The frame shown in FIG. 3 has a single pyramidal structure with four side faces. On the other hand, the frames shown in FIGS. 1-2 have an outer pyramidal frame to support the joint and an inner pyramidal frame with covers on each face to protect the motors, the roof attachment and any other similar structures.

Figure 4:
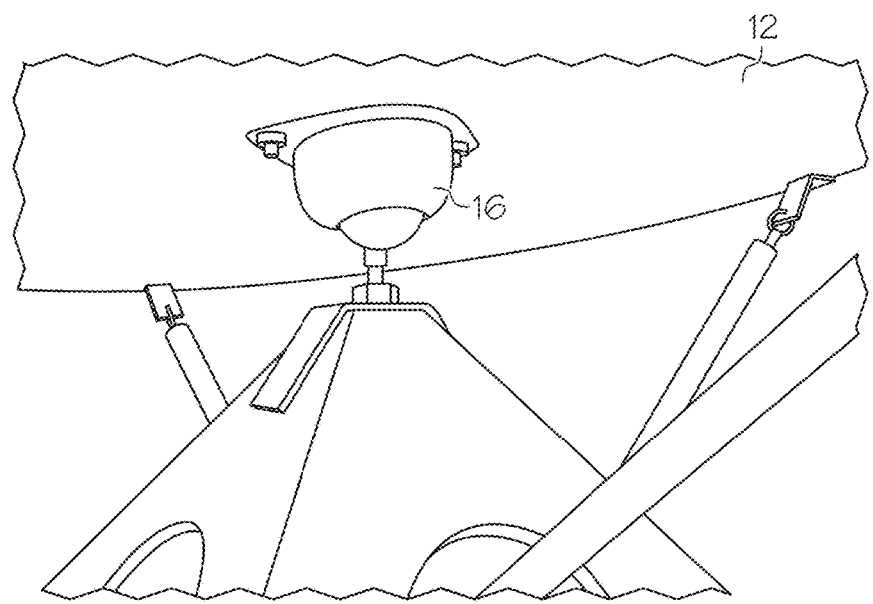
FIG. 4 is an enlarged view of an exemplary joint illustrated as a spherical joint connecting the end effector to a stand.

FIG. 4 is an enlargement of FIG. 3 in order to show the spherical joint between the pyramidal stand and the end effector. The spherical joint provides three degrees of freedom using a sphere fixed to one end (i.e., the pyramidal stand) and a socket fixed to the other end (i.e., the end effector). This embodiment may also be called a ball and socket joint. The first angle fixes two degrees of freedom, and the last tilt angle constrains the third degree of freedom. Some spherical rolling joints may be used for optical alignment that are used for parallel robots, such as the Stewart platform. These spherical joints offer a range of motion of at least 30 degrees from the zenith or at least 60 degrees total, which is sufficient for the brightest parts of a day east to west and for all of the north-south movement in most cases. The illustrated spherical joint has a screw welding to the ball or sphere and attached to the pyramidal stand.

FIGS. 5-9 show an embodiment of a circumscribed spherical joint with four spheres. In this embodiment, the assembly allows for zenith angles exceeding 90 degrees and up to 180 degrees. In addition to being used as components of optical fiber daylighting systems, the assembly can also be used as robotic coupling joint system for various applications in general, including in solar power systems or biomechanical applications.

Figure 5:
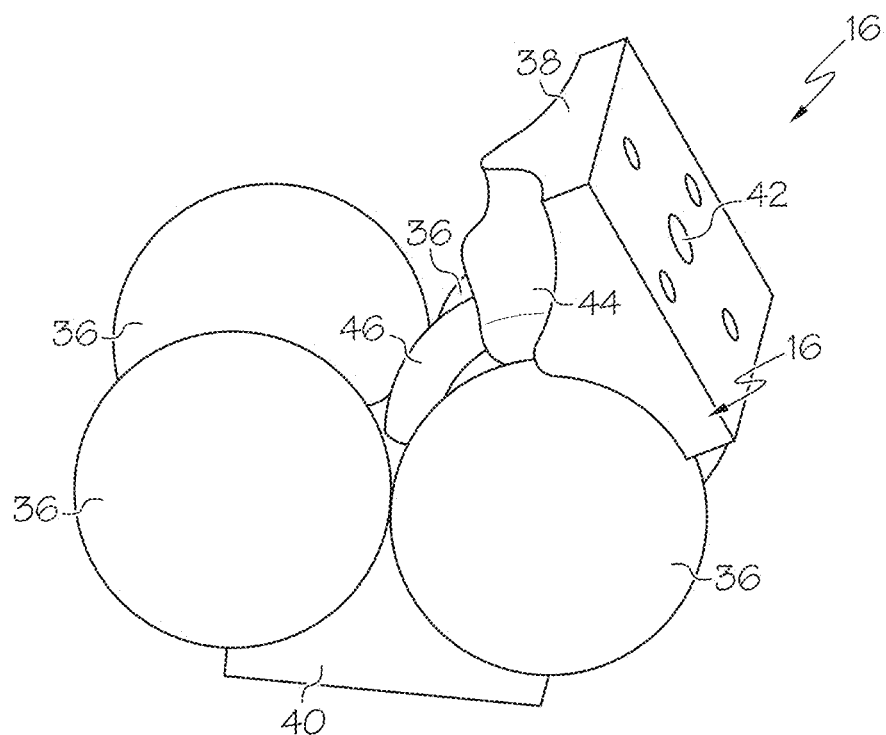
FIG. 5 is a perspective view of an exemplary spherical joint.

The design of the assembly in FIG. 5 has three or four components. The first component or a first or top plate has four spherical recessions or bosses, each allowing the first component to slide along one of the spheres of the second component. The first component is secured to the end effector, but may be secured to the stand or the like in other embodiments. The second component comprises four spheres with minimal spacing and a second or bottom plate. The spheres are preferably secured to the second plate, such via threaded openings in the spheres and second plate. The second component is secured to the stand but may be secured to the end effector or the like in other embodiments. A connector serves as the final component and holds the two plates together, with the spheres in between, and keeps them in constant compression. The view shown illustrates tilting about a first axis. In one arrangement (not shown), a steel cable is attached to the top plate, passes through a center hole in the bottom plate, and then is coupled with a weight. These assemblies may be useful for biomechanical purposes as well.

Figure 6:
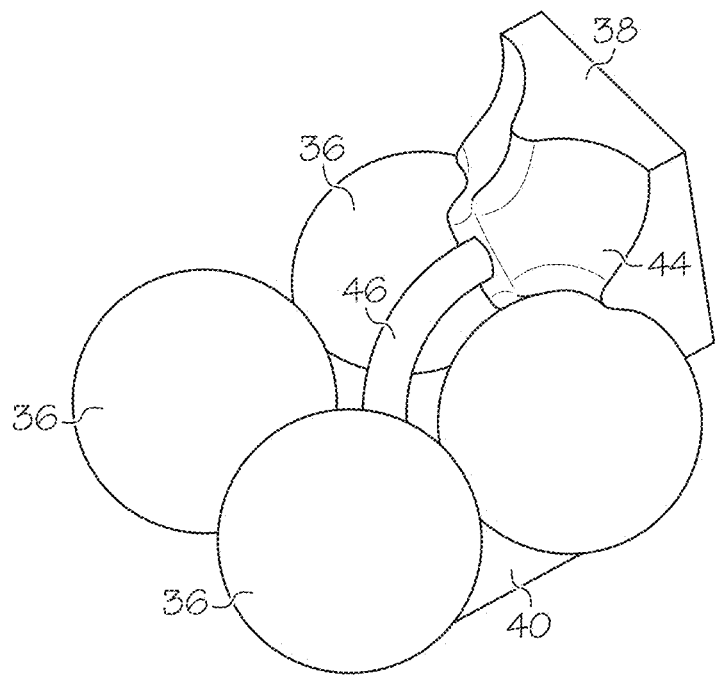
FIG. 6 is another perspective view of an exemplary spherical joint.
Figure 7:
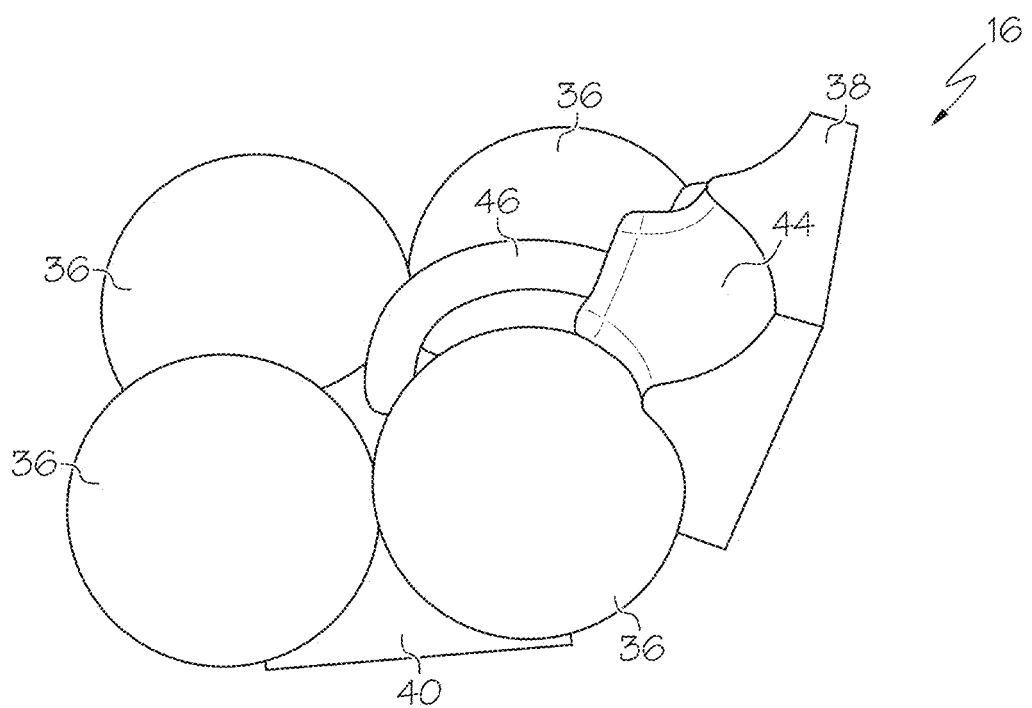
FIG. 7 is another perspective view of an exemplary spherical joint.
Figure 8:
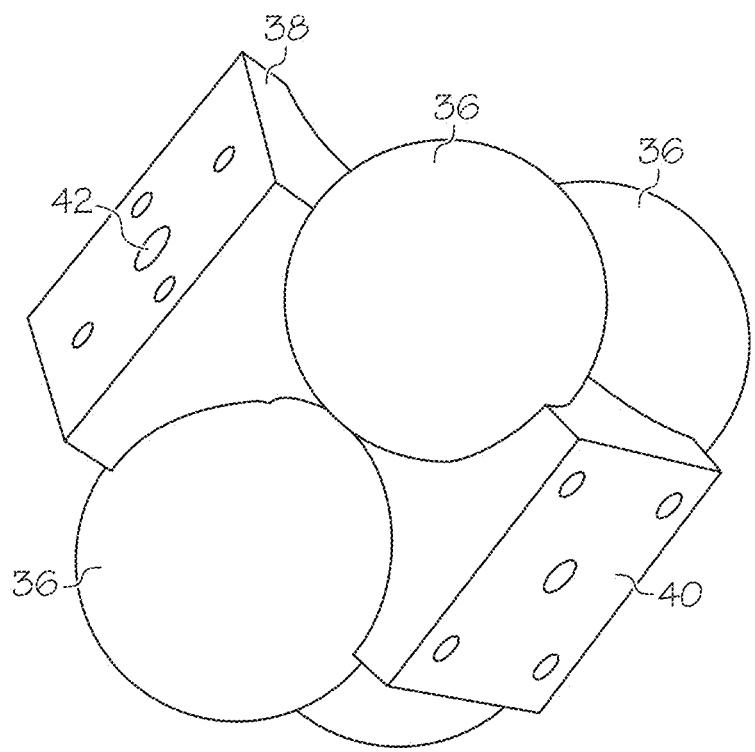
FIG. 8 is another perspective view of an exemplary spherical joint.
Figure 9:
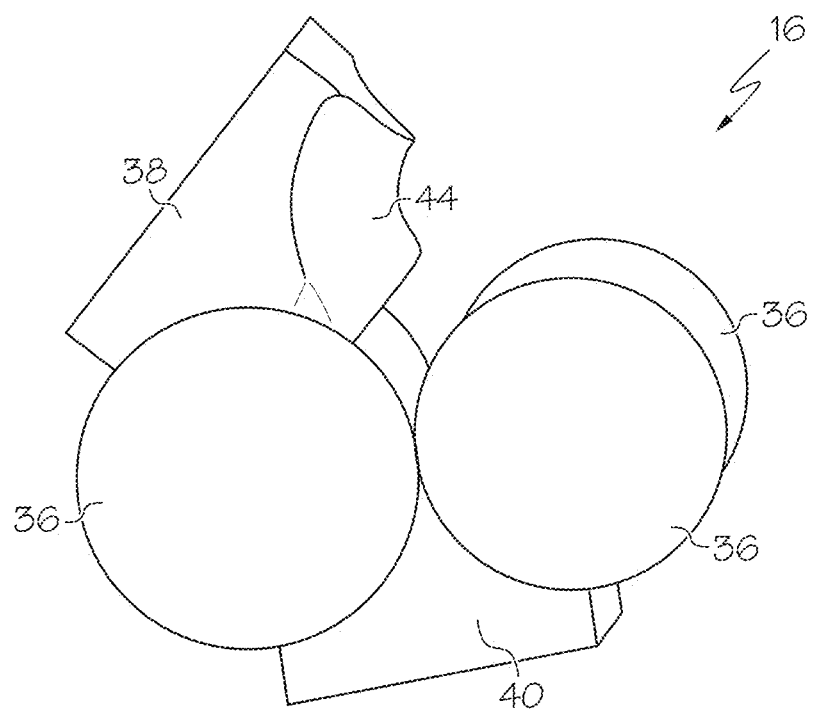
FIG. 9 is another perspective view of an exemplary spherical joint.

FIG. 6 shows an alternate side view of the circumscribed spherical joint. The view shown illustrates tilting about a second axis perpendicular to the first axis. Depending on the position of the end effector controlled by the mobility system, the top plate may be supported by all four spheres when it is parallel with the stand (e.g., FIG. 1); by two of the spheres when tilted about the first or second axis (as shown in FIGS. 5-9); or by only one sphere (not shown) when tilted about both the first and second axis. FIGS. 7-9 show alternative side views of circumscribed spherical joints.

Figure 10:
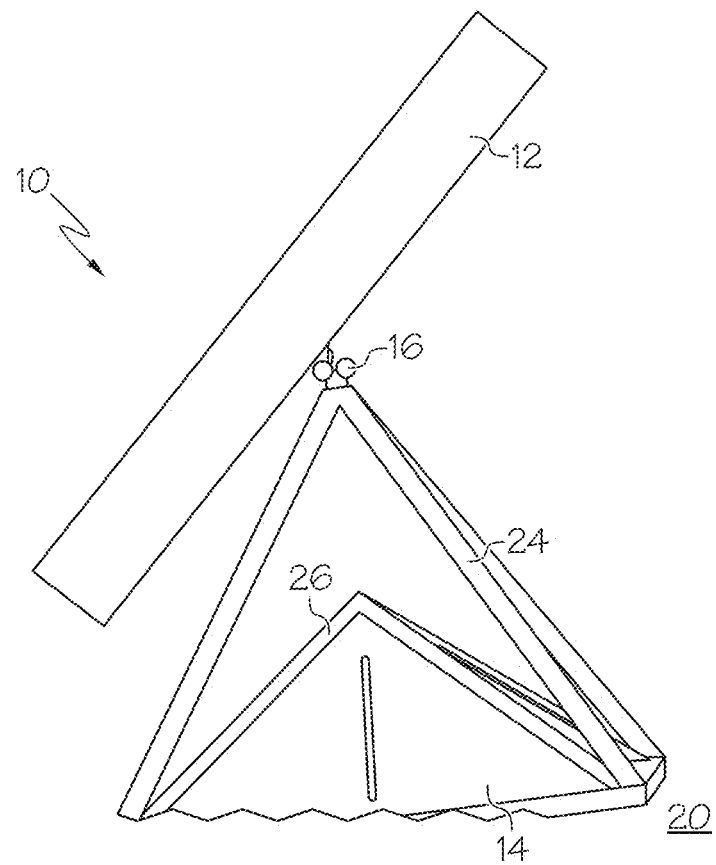
FIG. 10 is a side view of aspects of an exemplary daylighting and or solar tracking system.
Figure 11:
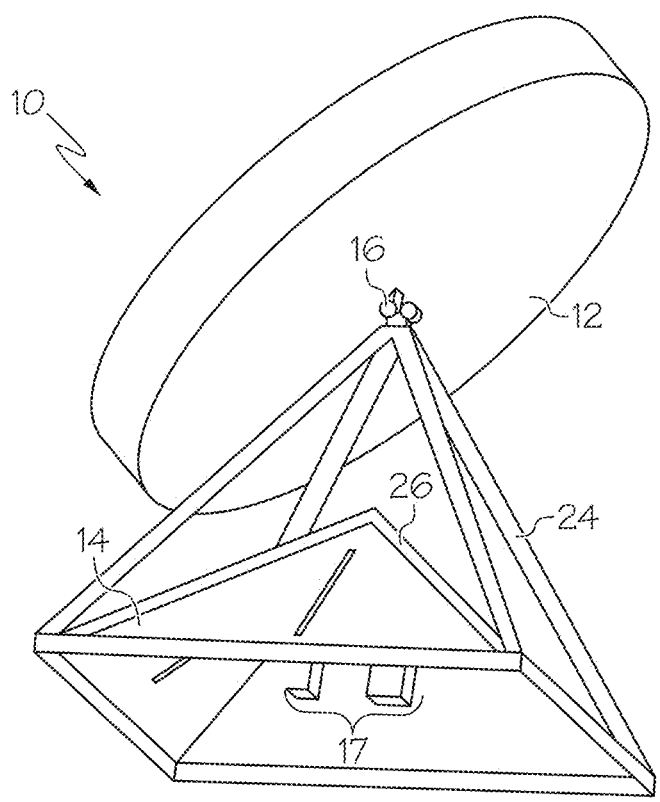
FIG. 11 is an underside view of aspects of an exemplary daylighting and or solar tracking system. side view of aspects of an exemplary daylighting and or solar tracking system.
Figure 12:
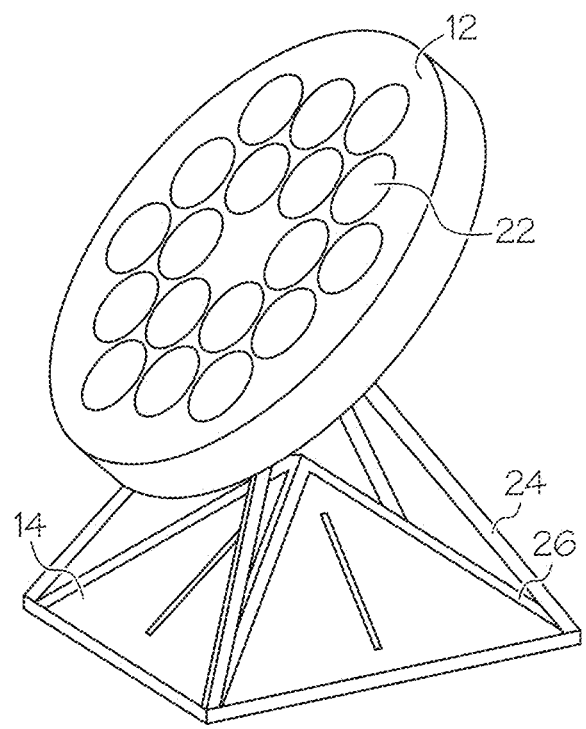
FIG. 12 is a front view of aspects of an exemplary daylighting and or solar tracking system.

FIG. 10 shows a side view of an optical fiber delighter with a circumscribed spherical joint. FIG. 11 shows a rear and underside view of an optical fiber daylighting system with a circumscribed spherical joint. FIG. 12 shows a front side view of an optical fiber daylighting system with a circumscribed spherical joint.

Figure 13:
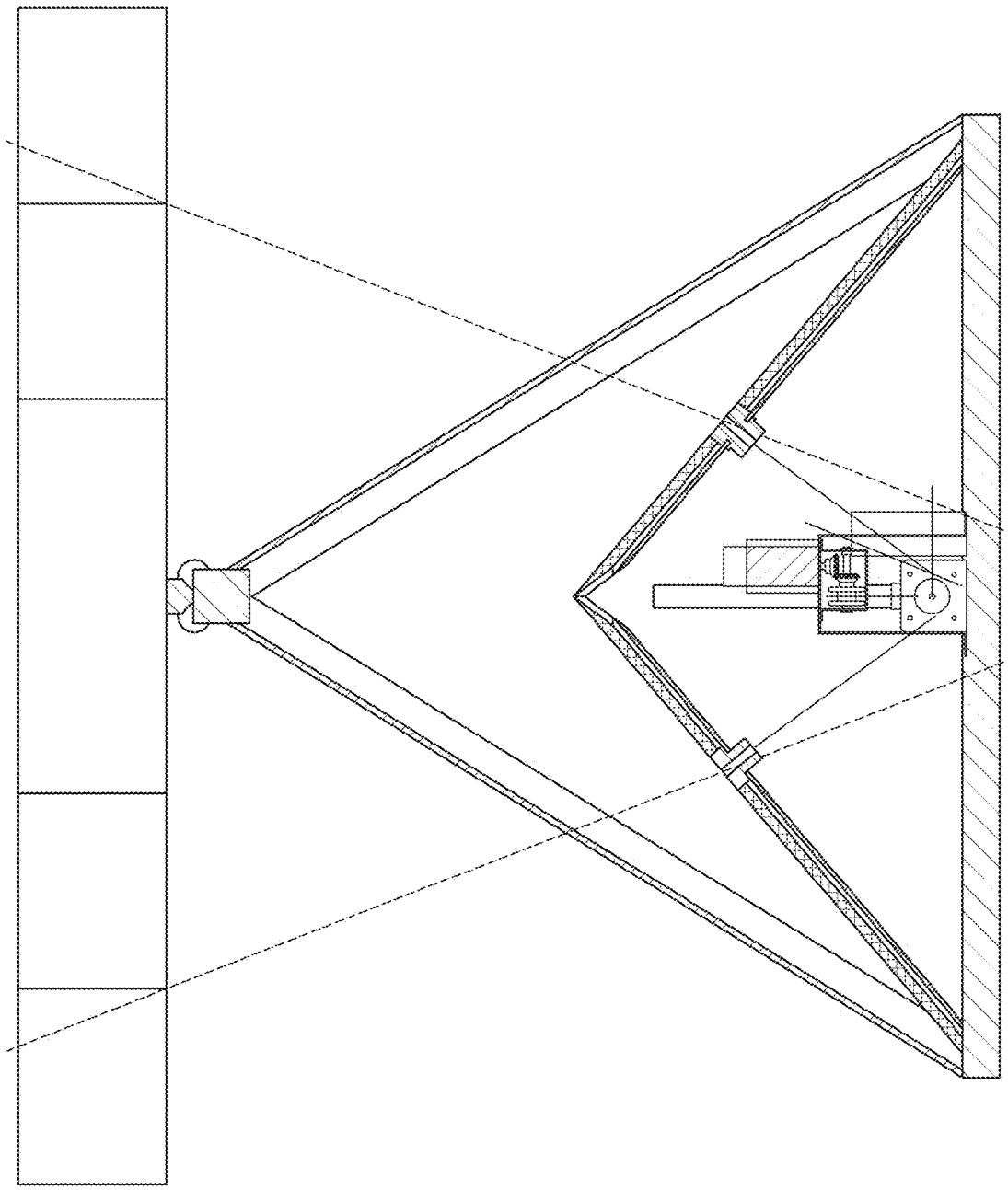
FIG. 13 is a cross-section view of an optical fiber daylighting system showing motors and cables attached between motor pulleys and the end effector.

FIG. 13 shows a cross-section view of an optical fiber daylighting system showing motors and cables attached between motor pulleys and the end effector. The portion of the cables outside of the inner cavity illustrates the portion of elastic band or cable that can be out of plane with the center plane of the motor drive pulley. The portion of the cables inside the inner cavity are in plane with the center plane of the motor pulley. The motion control objects, or guides, may be positioned in the apertures (e.g. slots) of the stand, and the guides may slide along the slot and constrains the elastic band or cable inside the internal cavity to a desired plane.

Figure 14:
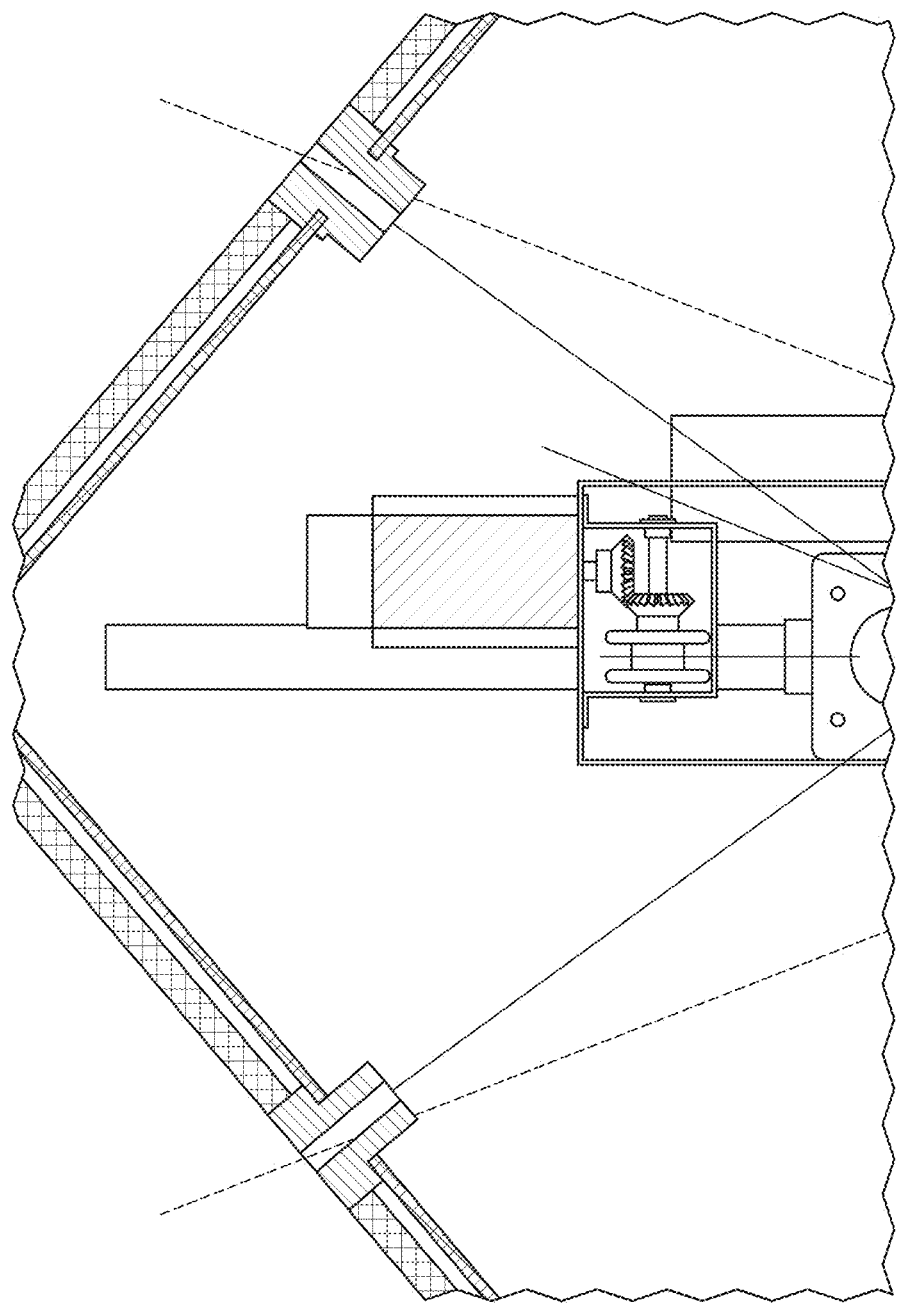
FIG. 14 is a partial section view illustrating an exemplary actuator of an exemplary daylighting and or solar tracking system.
Figure 15:
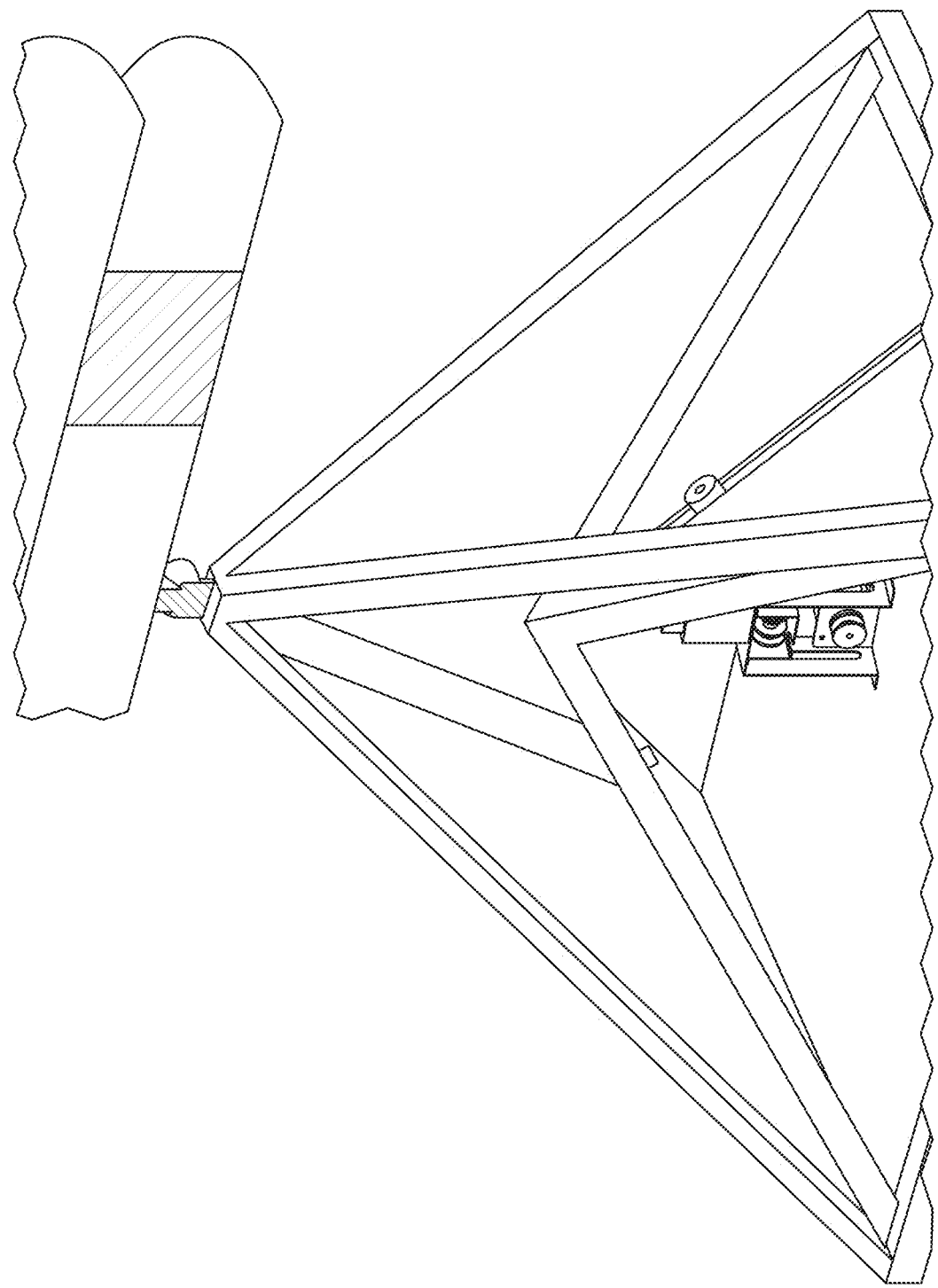
FIG. 15 illustrates aspects of an exemplary actuator of an exemplary daylighting and or solar tracking system.

FIG. 14 shows a side view showing cross sections of sliding cable guide in faces of the pyramidal stand. FIG. 15 is a perspective side view of a stand showing cable guides in stand faces and path of cables. The end effector is articulated using the cables that are attached to the motor drive pulleys. The guides on the frame panels/skins constrain the cables to the center plane of the respective motor drive pulley. The cables only move as much as is allowed by movement of the guides inside the pyramid structure housing. Once outside of the pyramid structure and through the guides, out of plane cable motion is allowed between the guides and the end effector.

As also shown in FIG. 15, the pyramidal base or stand has two frames. There is a larger outside pyramid that supports the end effector. The spherical joint is attached to the apex of the outer frame where the four rails of the pyramid meet at the top of the pyramid. The inside pyramid starts from the same bottom points but has shorter rails to meet at a lower top point for an inner pyramid. These shorter rails support four panels, covers, or skins between each pair of rails, to protect electronic equipment from the weather. The skins may also be used on the outer pyramid or a single outside pyramid may be used. In this case, the outer panels would be much larger than the inner panels, increasing weight and material cost.

The two frame system reduces cost, provides an easier installation for larger structures, and supports more custom solutions. Skins with guides on the outside pyramid also restrict the range of motion of the cables more than skins with guides on the inside pyramid since there is less room for out of plane motion for the cables. The fraction of in plane to out of plane cable distance is higher. It is better to reduce this ratio, which means more free motion. The in plane portion is necessary though to keep the cables aligned with the pulley.

FIG. 16 shows an isometric view of a dual-axis motor assembly cable drive. FIG. 17 shows an alternate isometric view of a dual-axis motor assembly cable drive. FIG. 18 shows a side view of a dual-axis motor assembly cable drive side. In some embodiments, the dual axis motor assembly cable drive may provide a motor for each pair of linking elements that allow tilting relative to the first axis and second axis. Further, the assembly may also include any pulleys, gearing, or combinations thereof desired.

Figure 19:
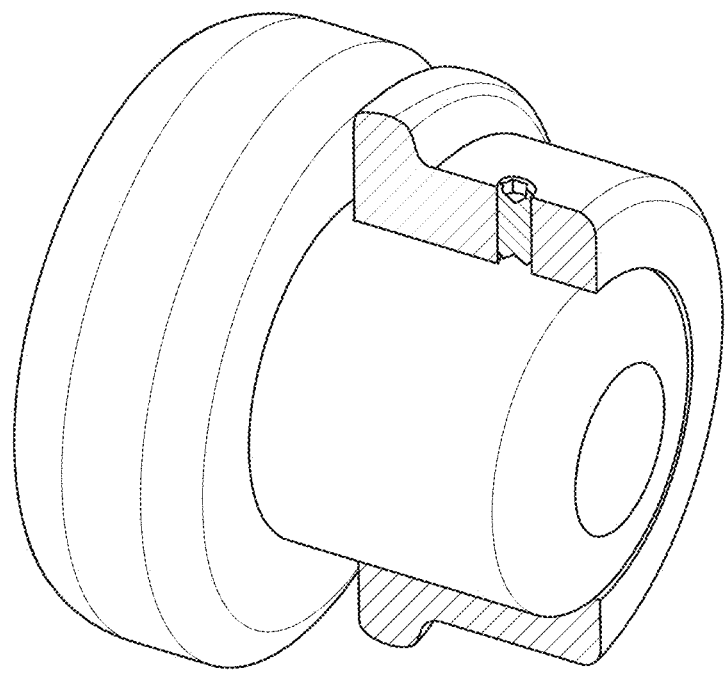
FIG. 19 is a partial sectional view of an exemplary cable guide assembly.

FIG. 19 shows a linking element or cable guide assembly. Top and bottom components may be held together with a fastener, such as a set screw. The surfaces of these components sliding on the panel/skin slot and/or linking element can be Teflon coated, or the parts themselves can be made of Teflon. The slots on the panel/skin that come in contact with this part can be Teflon coated as well. This will reduce the coefficient of friction. Alternatively roller bearings may be used.

Figure 21:
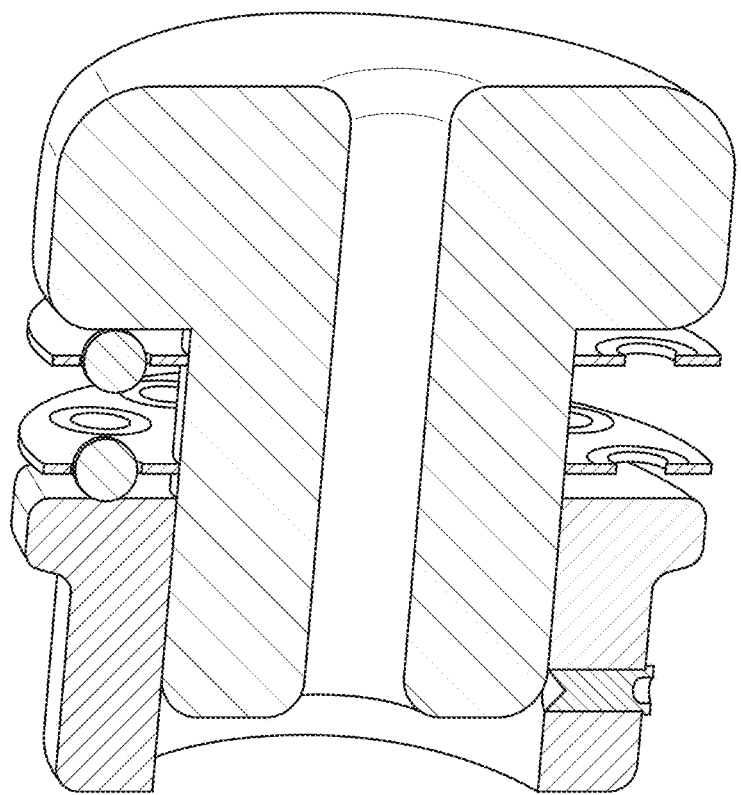
FIG. 21 illustrates an exemplary cable guide with bearings.
Figure 20:
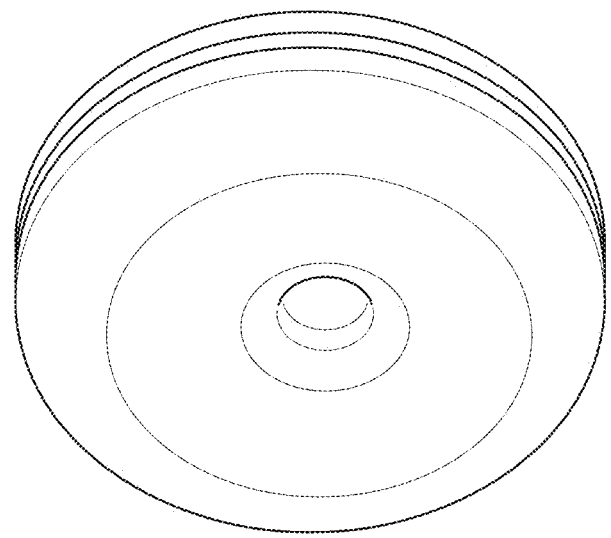
FIG. 20 illustrates an exemplary cable guide with a sliding groove.

FIG. 20 shows a cable guide and sliding groove. FIG. 21 shows a side cross-section view of a guide with bearings.

Figure 22:
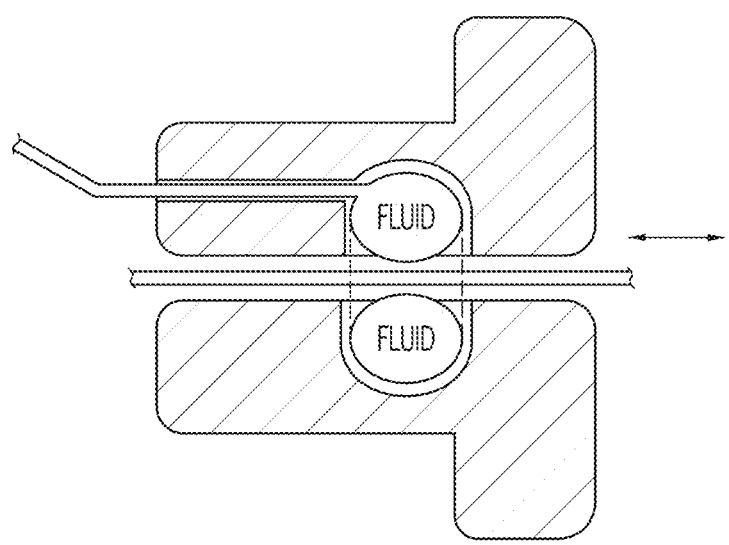
FIG. 22 illustrates an exemplary cable guide with bladders.

FIG. 22 shows a cross-sectional view of a guide with bladders. Bladders may be used to restrict movement of the linking elements, such as cables, in synchronization with the motors. When the motors stop moving the linking elements, then a controller actuates a pump to fill the bladders causing constrict around the linking element. When the motors are ready to move again then the bladders are released. The bladders stop the linking elements from moving within the guides. This is to keep the end effector in alignment if loads are present on the panel. An example is wind, rain, sleet, snow, or the like. The bladder expands within a groove of the guide to squeeze around the cable and prevent the cable from moving. One hydraulic or pneumatic hose is connected to each bladder and the connected hydraulic or pneumatic pump is fed to controls.

Figure 23:
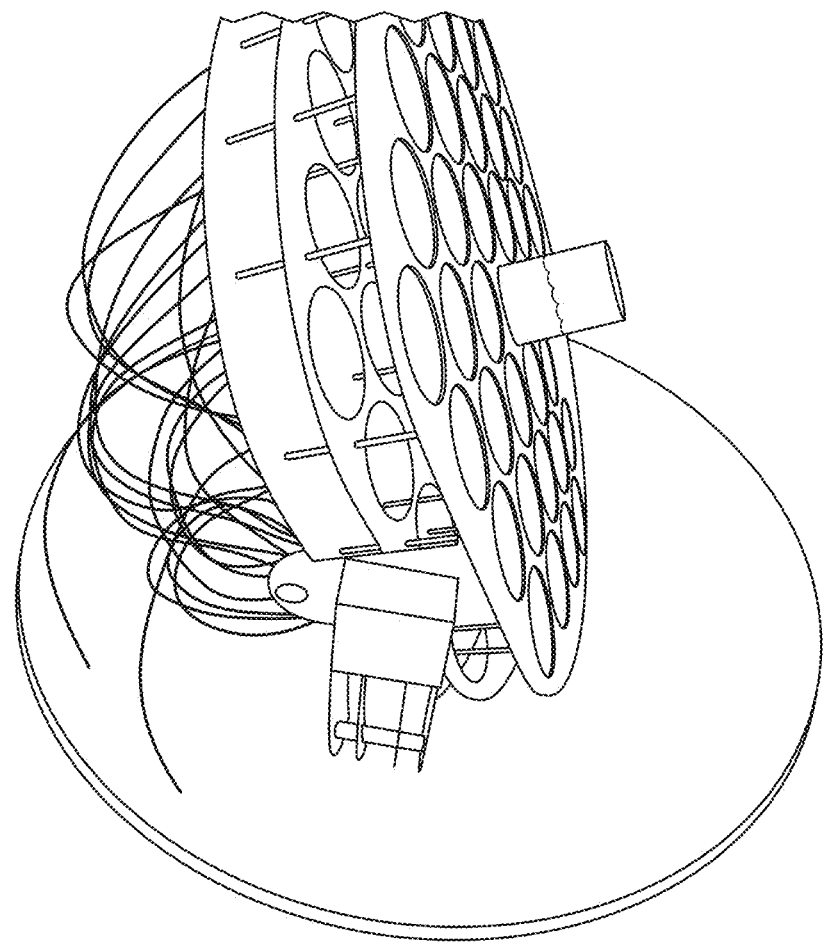
FIG. 23 illustrates an exemplary end effector with a protective plate.

FIG. 23 shows an end effector that has a protective plate. The end effector also has collectors and optic fibers extending from behind the collectors.

Figure 24:
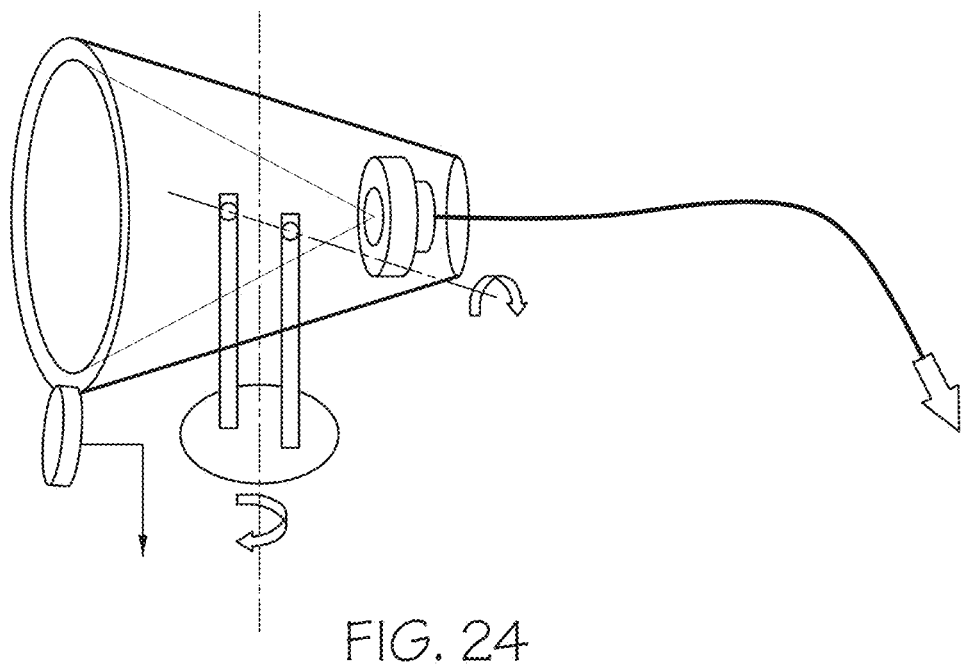
FIG. 24 illustrates another exemplary daylighting system.
Figure 25:
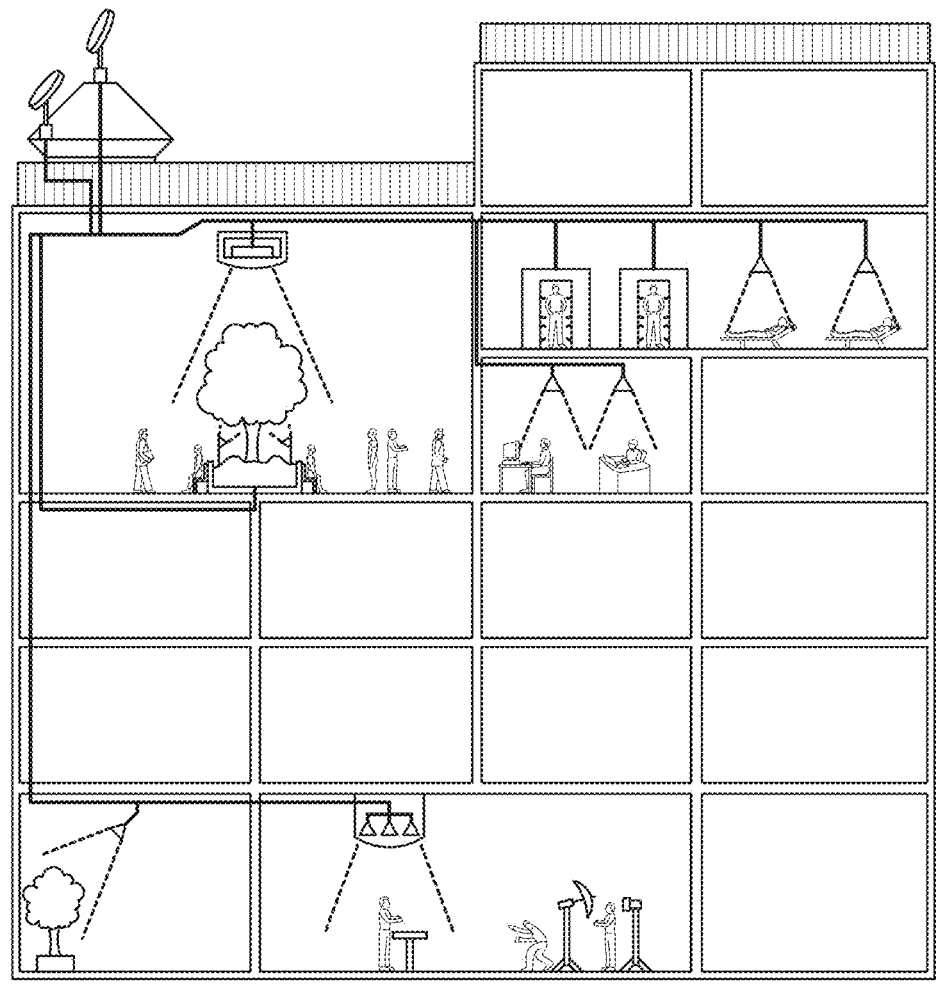
FIG. 25 illustrates an exemplary daylighting system applied to a building.

FIG. 24 shows another daylighting system. FIG. 25 shows a daylighting system applied to a building with collectors, fibers, and diffusors in many different interior spaces.

Figure 26:
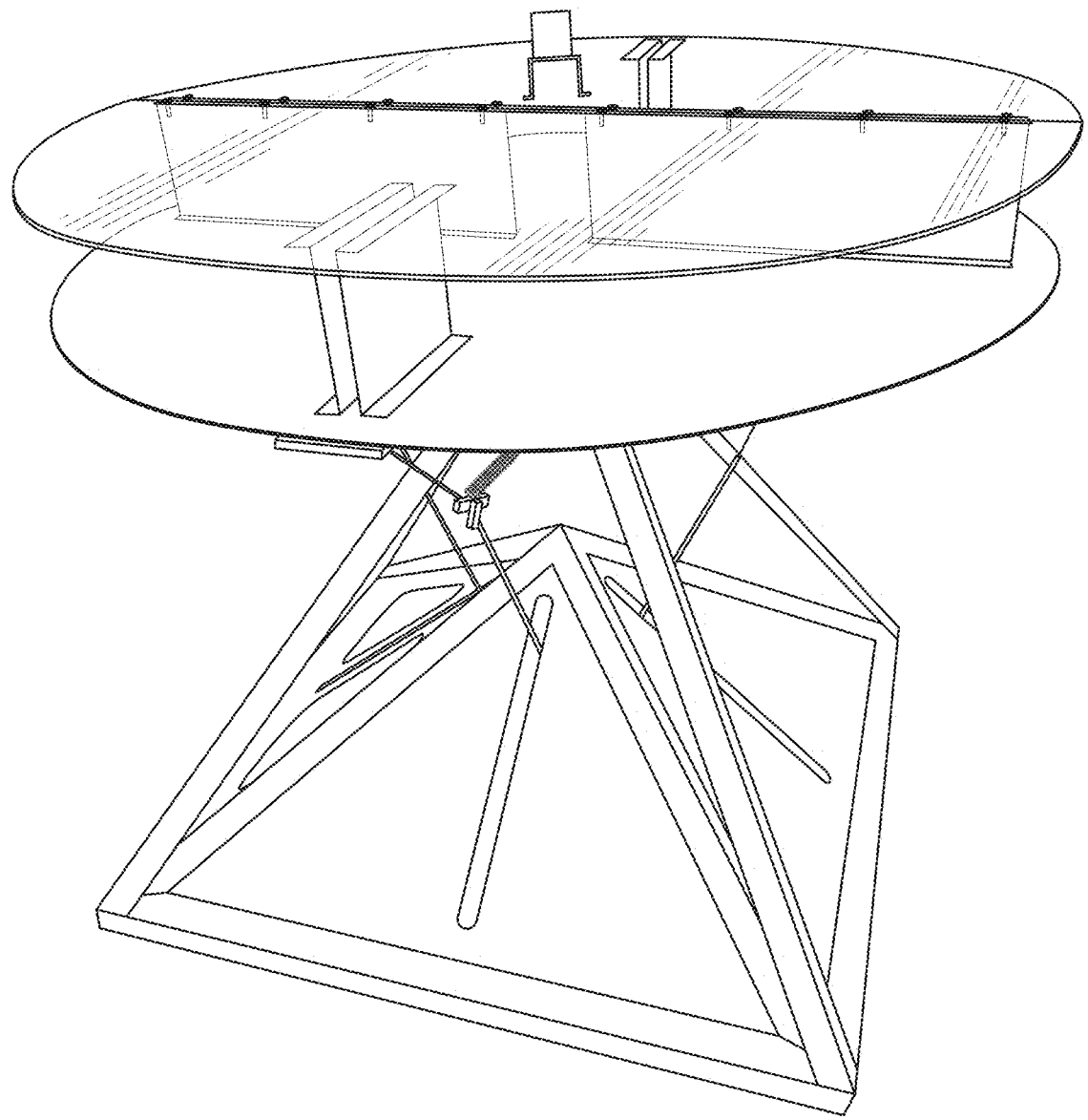
FIG. 26 illustrates another exemplary daylighting and or solar tracking system with springs connecting the cable linking elements to the end effector.

FIG. 26 shows an image of an alternative optical fiber daylighting system. In this example springs have been added to guide cables to act as tensioners.

Figure 27:
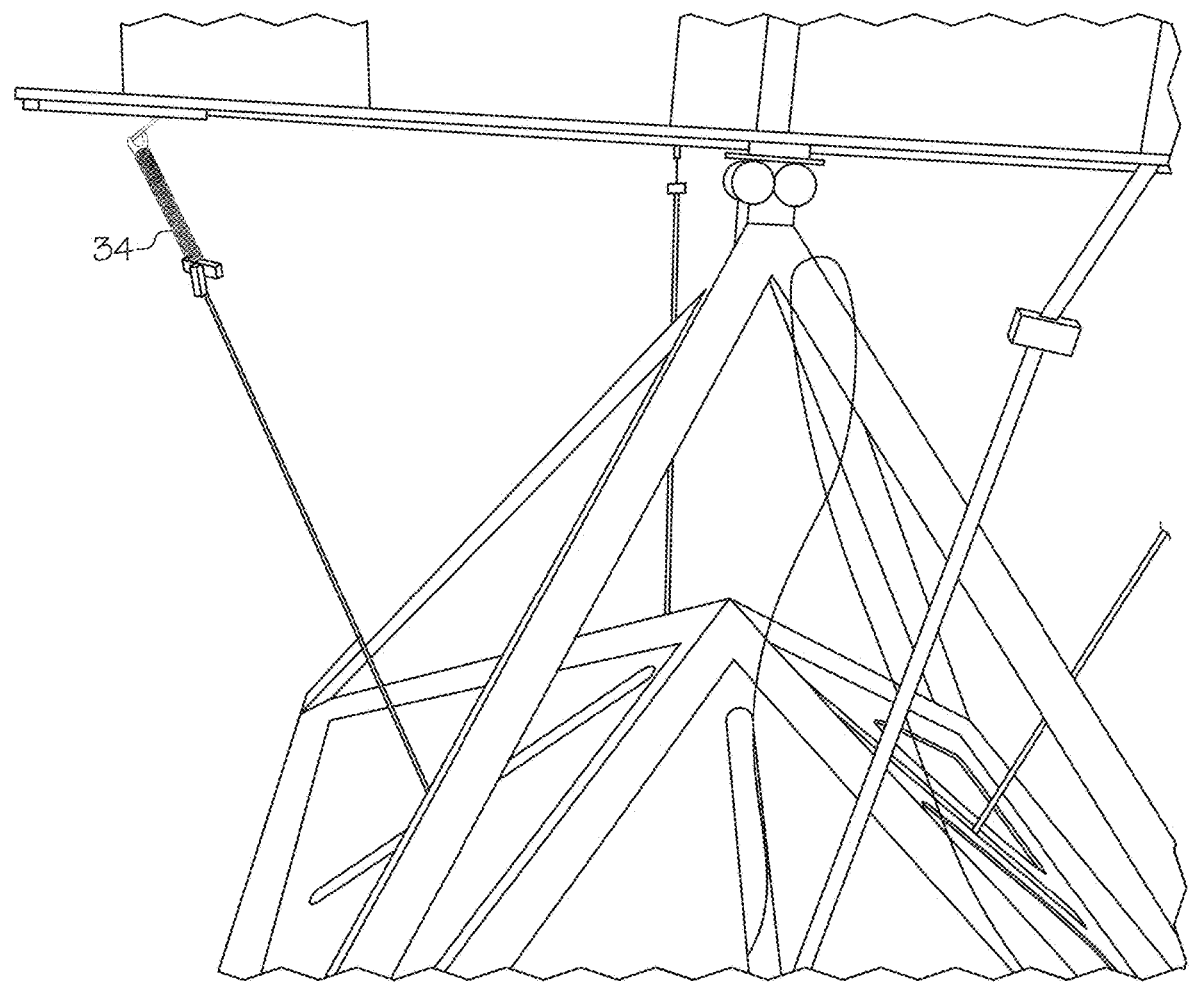
FIG. 27 illustrates a daylighting system without springs as illustrated in FIG. 26.

FIG. 27 is an image of another optical fiber daylighting system. In this example, the springs have been eliminated. In addition, the new circumscribed spherical joint is inverted, and there are swivel pulleys to restrict motion along the slot. The restricted motion along the slot allows that the slots to be minimized. A combination of belts and steel cables are used but should not be construed as limiting. Cables or belts can be used independently of another. The tracker may use a belt and spring tensioner to prevent belt slippage and to hold the end effector in a desired orientation. The steel cables are coupled for easier integration of the end effector.

The two-pyramid structure was an attempt to cut the cost of manufacturing the frame with maintaining stability and aesthetics. The inner pyramid uses fastened skins and panels which enclose the electrical components and provide a foundation for aligning the flexible linkages with a drive pulley or actuator. This is apart from other cable-drive systems found in the patent and academic literature. The other pyramid provides a robust base to support the end effector and protect the interior pyramid.

Figure 28:
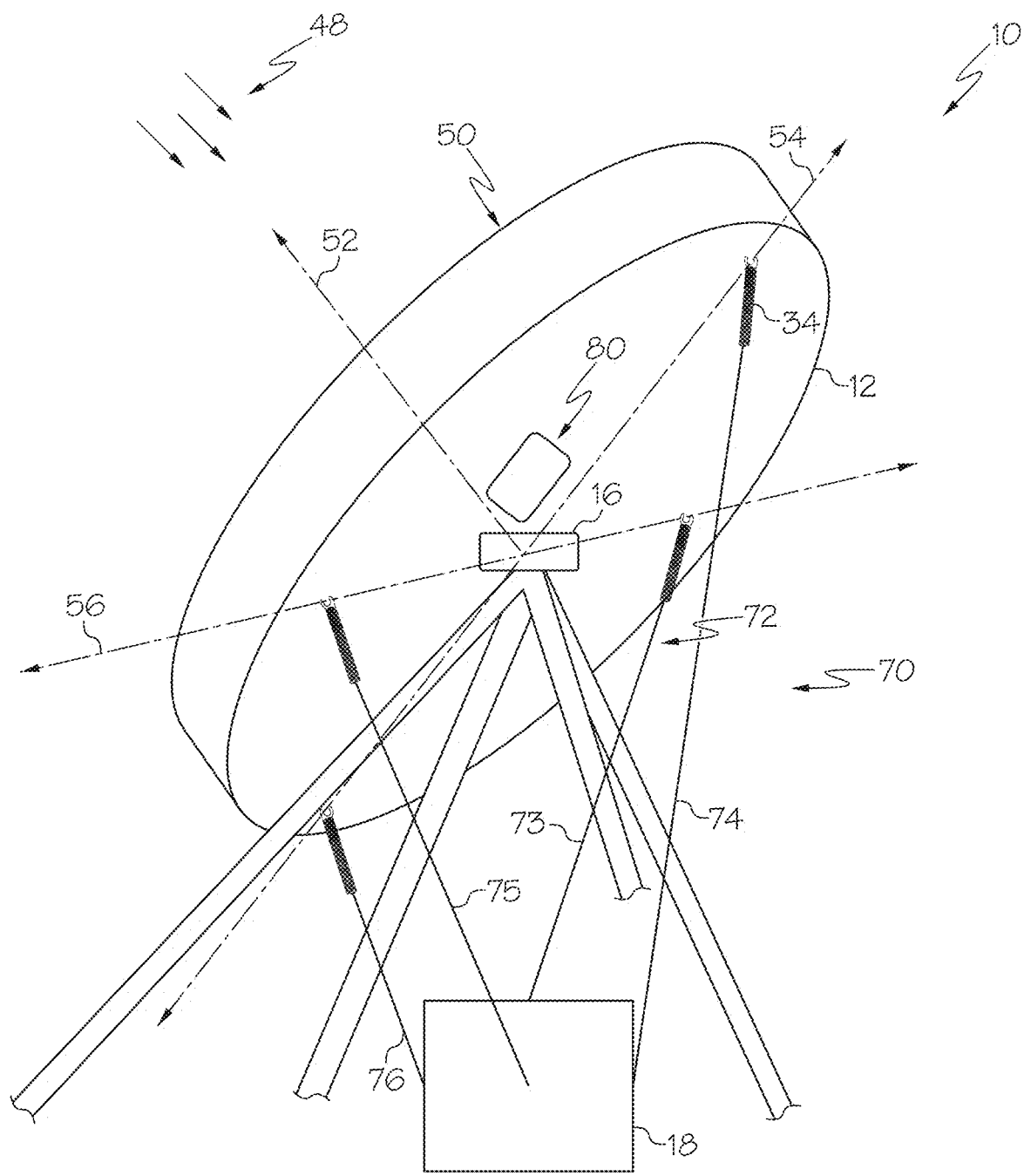
FIG. 28 is an exemplary embodiment of a solar tracking system according to aspects of the disclosure.
Figure 29:
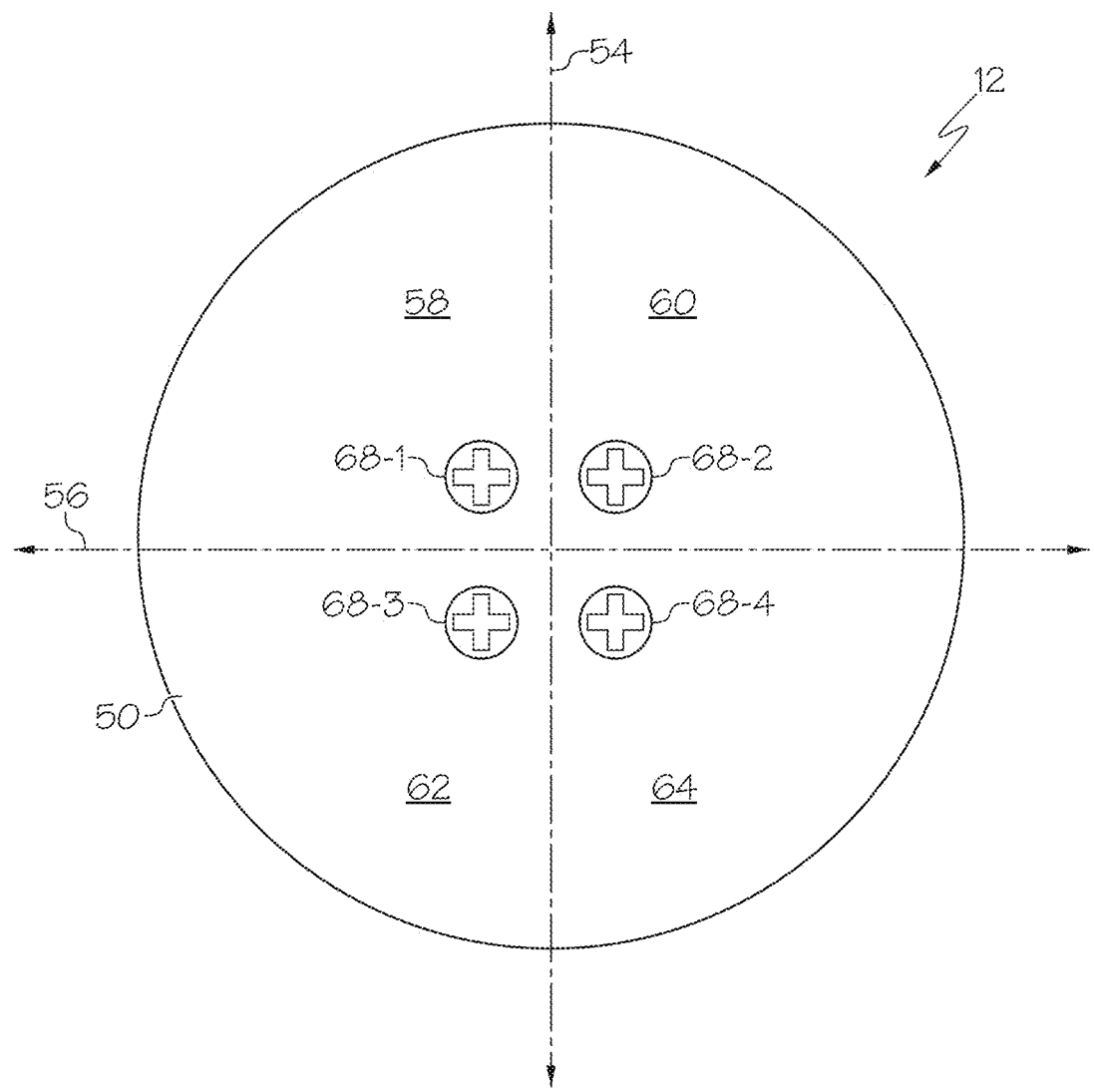
FIG. 29 is a front view of an exemplary end effector without the optical elements shown.
Figure 30:
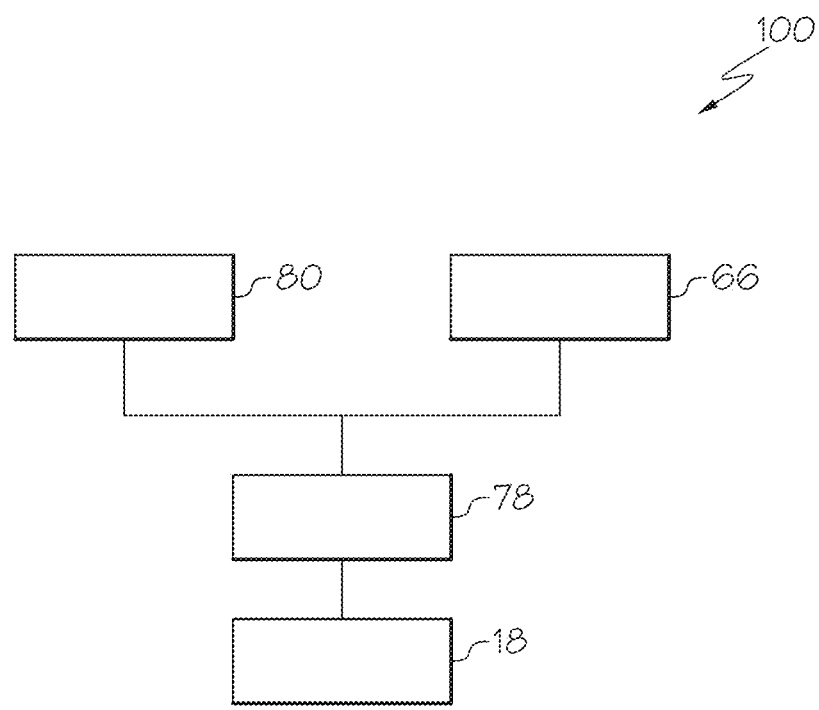
FIG. 30 illustrated a control system for tracking the end effector with the sun.

FIG. 28 illustrates another exemplary solar tracking system 10 having an end effector 12. FIG. 29 is a front view of end effector 12 of FIG. 28 showing face 50 of the end effector. FIGS. 28 and 29 do not illustrate the optical elements 22 (see, e.g., FIGS. 1A, 2A-B, 12) for the purpose of illustrating other aspects of the system. FIG. 30 illustrates a control system 100 configured for tracking the sun, e.g., sunlight, and moving the end effector based on receipt of sunlight 48.

In use, face 50 is oriented toward the sunlight. A central axis 52 (Z-axis) extends normal to face 50. An X-axis 54 and a Y-axis 56 divide face 50 into quadrants. The X-axis corresponds to movement of solar angle from the horizon to the zenith and the Y-axis corresponds to movement of a solar azimuth. The quadrants are a first upper quadrant 58 and a second upper quadrant 60 located on the upper side of the Y-axis and first and second lower quadrants 62, 64 located on the lower side of the Y-axis. First upper and first lower quadrants 58, 62 are located on the same first side of X-axis 54 and second upper and second lower quadrants 60, 64 are located on the same, second, side of X-axis 54.

System 10 includes a course sensor 66 (FIG. 30) comprising light dependent resistors (LDR), generally designated with reference number 68, located in the four quadrants. Course sensor 66 includes a first LDR 68-1 located in the first upper quadrant, a second LDR 68-2 located in the second upper quadrant, a third LDR 68-3 located in the first lower quadrant, and a fourth LDR 68-4 located in the second lower quadrant.

An actuator 18, e.g., one or more motors, is coupled to end effector 12 to move end effector along the X-axis and the Y-axis. Joint 16 coupling the stand to the end effector, for example at the Z-axis, permits movement along the X- and Y-axes. In some embodiments, joint 16 limits movement of end effector only to the two axes, X- and Y-. Actuator 18 may be coupled to the end effector by one or more linking elements. For example, in FIG. 28, the actuator is coupled to the end effector by a first pair of linking element 70 and a second pair of linking element 72. The first pair 70 including linking elements 74 and 76 and the second pair 72 including linking elements 73 and 75. First pair 70 of linking elements 74, 76 are secured to the end effector along X-axis 54 (for example on opposite sides of the Y-axis) and second pair 72 of linking elements 73, 75 are secured to the end effector along Y-axis 56 (for example on opposite sides of the X-axis). In some embodiments, each linking element is secured to the end effector via a spring 34.

Control system 100, see, e.g., FIG. 30, includes a controller 78 (e.g., processor, memory) in communication with course sensor 66 and actuator 18. Controller 78 may also be in communication with a tilt sensor 80 (FIG. 28) mounted on the end effector.

Figure 31:
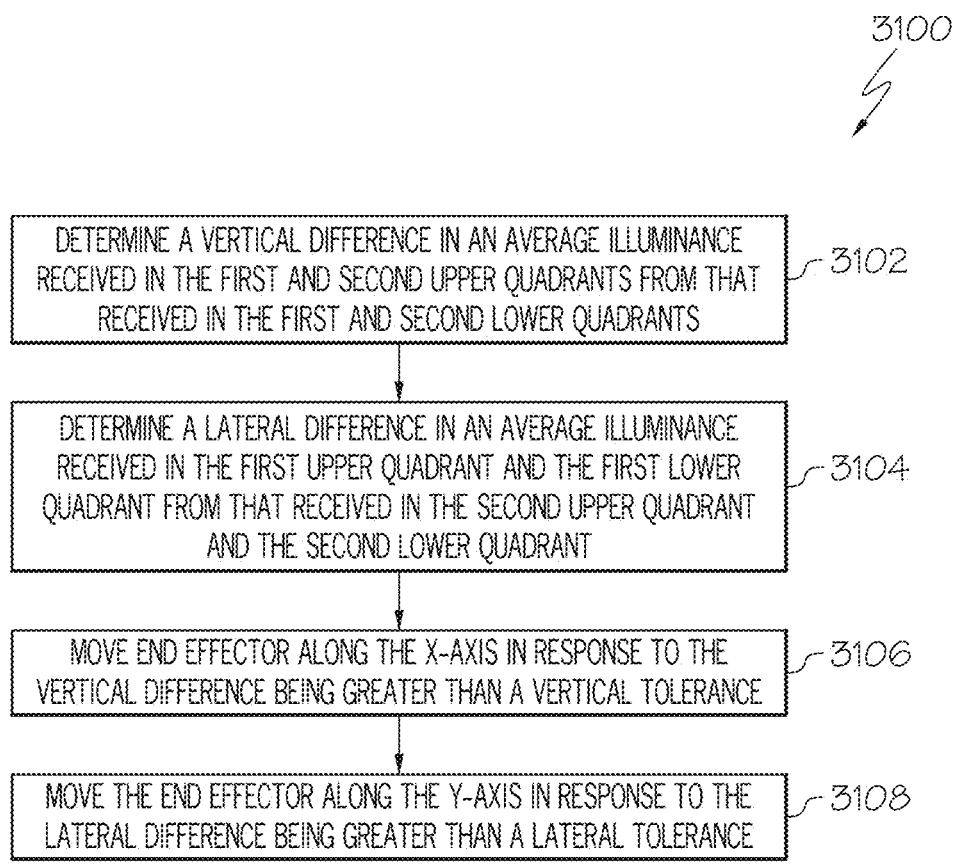
FIG. 31 illustrates an exemplary method of moving an end effector based on receipt of sunlight.

FIG. 31 is a block diagram illustrating an exemplary method 3100 of moving an end effector based on receipt of sunlight, which is described with reference to all of the figures. At block 3102 the controller determines a vertical difference in the average illuminance received (via LDRs 68-1, 68-2) in the first and second upper quadrants 58, 60 from the average illuminance received (via LDRs 68-3, 68-4) in the first and second lower quadrants 62, 64. For example, the illuminance in the upper quadrants 58, 60 is averaged and the illuminance in the lower quadrants 62, 64 is averaged and the difference in the averages is determined. At block 3104 the controller determines a lateral difference in the average illuminance received (via LDRs 68-1, 68-3) in the first upper and first lower quadrants 58, 62 from the average illuminance received (via LDRs 68-2, 68-4) in the second upper and the second lower quadrants 60, 64. At block 3106 the end effector is moved along the X-axis (i.e., rotated about the Y-axis) in response to the vertical difference being greater than a vertical tolerance. For example, the end effector is moved in the direction of the higher average illuminance. Similarly, at block 3108, the end effector is moved along the Y-axis (i.e., rotated about the X-axis) in response to the lateral difference being greater than a lateral tolerance. The tolerances may be selected by the user based on various factors including, without limitation, the season, condition and age of the end effector, latitude location of the system. Exemplary tolerances, lateral and vertical, include a difference greater than zero, approximately 5-percent, 10-percent, and 20-percent. For example, a percentage difference between upper and lower quadrants or percentage difference between left and right quadrants. A preference may be selected as to which axis movement should initiate the end effector movement process, for example begin with rotation of the Y-axis about the X-axis or rotation of the X-axis about the Y-axis. The selection may be arbitrary or based for example on light sensor data. For example, selection may be based on the greater illumination values measured in adjacent quadrants, e.g., the direction of largest disparity in illumination detected by the LDRs 68. For example, if the greatest and second greatest illumination values are measured in the adjacent upper quadrants 68-1, 68-2, or the adjacent lower quadrants 68-3, 68-4, then the initial direction of rotation is the X-axis 54 rotating about the Y-axis 56. Similarly, if the greatest and second greatest illumination values are measured in adjacent first upper and lower quadrants 68-1, 68-3, or second upper and lower quadrants 68-2, 68-4, then the initial direction of rotation can be the Y-axis 56 rotating about the X-axis 54.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A solar tracking system, the system comprising:
   an end effector comprising optical elements, a face for orienting toward sunlight, a central axis extending normal to the face, and an X-axis and a Y-axis dividing the face into quadrants, the X-axis corresponding to a solar angle and the Y-axis corresponding to a solar azimuth;
   a course sensor comprising light dependent resistors (LDRs) mounted on the face to measure illuminance, the LDRs comprising a first LDR located in a first upper quadrant, a second LDR located in a second upper quadrant, a third LDR located in a first lower quadrant, and a fourth LDR located in a second lower quadrant, wherein the first and second upper quadrants are located on an upper side of the Y-axis, the first and second lower quadrants are located on a lower side of the Y-axis, the first upper quadrant and the first lower quadrant are located on a first side of the X-axis, and the second upper quadrant and the second lower quadrant are located on a second side of the X-axis;
   an actuator coupled to the end effector;
   a controller in communication with the course sensor and the actuator, the controller configured to:
     determine a vertical difference between an average of the illuminance received in the first and second upper quadrants and an average of the illuminance received in the first and second lower quadrants;
     determine a lateral difference between an average of the illuminance received in the first upper quadrant and the first lower quadrant and an average of the illuminance received in the second upper quadrant and the second lower quadrant;
     cause the end effector to move along the X-axis in response to comparing the vertical difference to a vertical tolerance; and
     cause the end effector to move along the Y-axis in response to comparing the lateral difference to a lateral tolerance.

2. The system of claim 1, wherein the optical elements comprise a 12-sided Fresnel lens.

3. The system of claim 1, wherein the vertical tolerance and the lateral tolerance is a difference of approximately 10 percent.

4. The system of claim 1, wherein the vertical tolerance and the lateral tolerance is approximately 5 percent.

5. The system of claim 1, wherein the vertical tolerance and the lateral tolerance is zero.

6. The system of claim 1, wherein the actuator is coupled to the end effector by a first linking element secured to end effector on the X-axis and a second linking element secured to the end effector on the Y-axis.

7. The system of claim 1, wherein the actuator is coupled to the end effector by a first pair of linking elements secured to the end effector along the X-axis and a second pair of linking elements secured to the end effector along the Y-axis.

8. The system of claim 1, wherein the actuator is coupled to the end effector by a first pair of linking elements and a second pair of linking elements;
   the first pair of linking elements comprising a first linking element secured to the end effector along the X-axis on the upper side and a second linking element secured to the end effector along the X-axis on the lower side; and the second pair of linking elements comprising a third linking element secured to the end effector along the Y-axis on the first side and a fourth linking element secured to the end effector along the Y-axis on the second side.

9. The system of claim 8, wherein each linking element is a cable and is secured to the end effector via a spring.

10. The system of claim 1, further comprising a joint coupling the end effector to a stand.

11. The system of claim 10, wherein the joint is a spherical joint.

12. The system of claim 10, wherein the joint allows movement of the end effector only along the X-axis and the Y-axis.

13. The system of claim 10, wherein the joint is located at the central axis.

14. The system of claim 10, wherein the actuator is coupled to the end effector by a first pair of linking elements and a second pair of linking elements;
   the first pair of linking elements comprising a first linking element secured to the end effector along the X-axis on the upper side and a second linking element secured to the end effector along the X-axis on the lower side; and
   the second pair of linking elements comprising a third linking element secured to the end effector along the Y-axis on the first side and a fourth linking element secured to the end effector along the Y-axis on the second side.

15. The system of claim 14, wherein each linking element is a cable and is secured to the end effector via a spring.

16. The system of claim 14, wherein the joint is a spherical joint.

17. The system of claim 14, wherein the joint allows movement of the end effector only along the X-axis and the Y-axis.

18. A method for moving an end effector based on receipt of sunlight, the end effector comprising optical elements; a face for orienting toward sunlight; a central axis extending normal to the face and an X-axis and a Y-axis dividing the face into quadrants, the X-axis corresponding to a solar angle and the Y-axis corresponding to a solar azimuth; and a course sensor comprising light dependent resistors (LDRs) mounted on the face to measure illuminance, the LDRs comprising a first LDR located in a first upper quadrant, a second LDR located in a second upper quadrant, a third LDR located in a first lower quadrant, and a fourth LDR located in a second lower quadrant, wherein the first and second upper quadrants are located on an upper side of the Y-axis, the first and second lower quadrants are located on a lower side of the Y-axis, the first upper quadrant and the first lower quadrant are located on a first side of the X-axis, and the second upper quadrant and the second lower quadrant are located on a second side of the X-axis, method comprising:
   determining a vertical difference between an average of the illuminance received in the first and second upper quadrants and an average of the illuminance received in the first and second lower quadrants;
   determining a lateral difference between an average of the illuminance received in the first upper quadrant and the first lower quadrant and an average of the illuminance received in the second upper quadrant and the second lower quadrant;
   moving end effector along the X-axis in response to comparing the vertical difference to a vertical tolerance; and
   moving the end effector along the Y-axis in response to comparing the lateral difference to a lateral tolerance.

19. The method of claim 18, wherein an actuator is coupled to the end effector by a first pair of linking elements and a second pair of linking elements;
   the first pair of linking elements comprising a first linking element secured to the end effector along the X-axis on the upper side and a second linking element secured to the end effector along the X-axis on the lower side; and
   the second pair of linking elements comprising a third linking element secured to the end effector along the Y-axis on the first side and a fourth linking element secured to the end effector along the Y-axis on the second side.

20. The method of claim 19, wherein each linking element is a cable and is secured to the end effector via a spring.

* * * * *